United States Patent
Moradnia et al.

(10) Patent No.: US 11,890,923 B2
(45) Date of Patent: Feb. 6, 2024

(54) UPPER BODY HEAT EXCHANGER FOR VEHICLES

(71) Applicant: Honda Motor Co., Ltd., Tokyo (JP)

(72) Inventors: Pirooz Moradnia, Dublin, OH (US); Daniel A. Favela Tentori, Columbus, OH (US); David W. Halt, Marysville, OH (US); Matthew L. Metka, Plain City, OH (US); Pratap Thamanna Rao, Columbus, OH (US); Brian R. Reynolds, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 70 days.

(21) Appl. No.: 17/204,392

(22) Filed: Mar. 17, 2021

(65) Prior Publication Data
US 2021/0402870 A1 Dec. 30, 2021

Related U.S. Application Data

(63) Continuation-in-part of application No. 16/910,680, filed on Jun. 24, 2020, now Pat. No. 11,642,933.

(51) Int. Cl.
*B60K 11/04* (2006.01)
*B62D 25/12* (2006.01)
(Continued)

(52) U.S. Cl.
CPC ............... *B60K 11/04* (2013.01); *B60K 11/02* (2013.01); *B62D 25/085* (2013.01); *B62D 25/12* (2013.01);
(Continued)

(58) Field of Classification Search
CPC .. B60K 11/04; B60K 11/02; B60K 2001/005; B60K 2001/006; B60K 11/06;
(Continued)

(56) References Cited

U.S. PATENT DOCUMENTS 668,033 A * 2/1901 Bohm ................ B61D 27/0081
165/44
1,829,374 A * 10/1931 Saunders ................ F01P 11/10
165/44
(Continued)

FOREIGN PATENT DOCUMENTS

DE  2931812 A1  2/1981
DE  102004010632 A1  10/2005
(Continued)

*Primary Examiner* — Ljiljana V. Ciric
(74) *Attorney, Agent, or Firm* — Plumsea Law Group, LLC

(57) ABSTRACT

Embodiments of an upper body heat exchanger for a vehicle. In one embodiment, an upper body heat exchanger includes a first portion having a plurality of fins disposed on a first surface. The upper body heat exchanger also includes a second portion having a plurality of heat transfer fluid passages disposed on a second surface of the upper body heat exchanger. The second portion is beneath the first portion. The upper body heat exchanger is mounted on the vehicle such that the first surface of the first portion of the upper body heat exchanger is exposed. The plurality of heat transfer fluid passages are configured to transfer heat from heated fluid flowing through the plurality of heat transfer fluid passages to airflows interacting with the plurality of fins as the vehicle is moving.

18 Claims, 21 Drawing Sheets

(51) Int. Cl.
| | |
|---|---|
| *F01P 11/10* | (2006.01) |
| *B60K 11/02* | (2006.01) |
| *F01P 3/18* | (2006.01) |
| *F01P 7/10* | (2006.01) |
| *B62D 25/08* | (2006.01) |
| *B60K 1/00* | (2006.01) |

(52) U.S. Cl.
CPC ............... *F01P 3/18* (2013.01); *F01P 7/10* (2013.01); *F01P 11/10* (2013.01); *B60K 2001/005* (2013.01); *B60K 2001/006* (2013.01); *F01P 2050/24* (2013.01); *Y02T 10/70* (2013.01)

(58) Field of Classification Search
CPC ......... B62D 25/085; B62D 25/12; F01P 3/18; F01P 7/10; F01P 11/10; F01P 2050/24; Y02T 10/70; B60L 58/26; B60L 58/27; B60L 2240/425; B60L 2240/545
USPC .......................................................... 165/44
See application file for complete search history.

(56) References Cited

U.S. PATENT DOCUMENTS

| | | | | |
|---|---|---|---|---|
| 2,074,350 | A * | 3/1937 | Wood | F01P 11/02 165/44 |
| 2,134,724 | A * | 11/1938 | McClanahan | B60H 1/247 454/165 |
| 2,162,512 | A * | 6/1939 | McPherson | B60H 1/3227 165/44 |
| 2,187,946 | A * | 1/1940 | Lyon | F01P 7/10 454/145 |
| 2,216,111 | A * | 10/1940 | Huet | B60K 11/06 165/44 |
| 2,895,313 | A * | 7/1959 | Flick | B60H 1/3227 165/41 |
| 4,051,692 | A * | 10/1977 | Ku | B60H 1/3202 62/309 |
| 4,249,626 | A * | 2/1981 | Fields | F28D 1/05383 165/47 |
| 4,658,599 | A * | 4/1987 | Kajiwara | F28D 15/0266 62/235.1 |
| 4,702,079 | A * | 10/1987 | Saito | F28D 1/0316 165/41 |
| 4,784,215 | A * | 11/1988 | Sing | B60J 1/2091 165/47 |
| 4,909,044 | A * | 3/1990 | Gudmundsen | B60H 1/00007 62/236 |
| 4,924,826 | A * | 5/1990 | Vinson | F01P 7/12 123/195 C |
| 4,986,343 | A * | 1/1991 | Sing | B60J 1/2091 165/47 |
| 5,046,554 | A * | 9/1991 | Iwasaki | B60K 11/04 165/44 |
| 5,129,473 | A * | 7/1992 | Boyer | F01P 5/06 180/68.1 |
| 5,285,863 | A * | 2/1994 | Miki | B66F 9/07595 180/68.2 |
| 5,718,281 | A * | 2/1998 | Bartalone | F01P 11/029 165/41 |
| 5,950,710 | A * | 9/1999 | Liu | F28D 15/06 165/41 |
| 6,390,217 | B1 * | 5/2002 | O'Brien | B60K 11/04 160/DIG. 1 |
| 6,505,696 | B1 | 1/2003 | Prevost | |
| 6,634,448 | B2 | 10/2003 | Bland | |
| 6,964,294 | B2 * | 11/2005 | Hendricks | H05K 7/20881 165/41 |
| 7,434,611 | B2 | 10/2008 | Wunderlich et al. | |
| 7,530,386 | B2 * | 5/2009 | Nagayama | B60H 1/00295 165/41 |
| 7,559,391 | B2 * | 7/2009 | Bradley | B60K 11/085 180/68.1 |
| 8,172,307 | B2 * | 5/2012 | Froeschle | B60K 13/02 296/180.1 |
| 8,210,600 | B1 * | 7/2012 | Verhee | B62D 35/005 296/180.1 |
| 8,297,393 | B2 * | 10/2012 | Froeschle | B60J 1/2008 180/68.1 |
| 8,919,862 | B2 * | 12/2014 | Inoue | B62D 35/00 296/213 |
| 9,103,605 | B2 * | 8/2015 | Mornet | H01L 23/3733 |
| 9,469,187 | B1 * | 10/2016 | Ho | B60H 1/3227 |
| 9,731,592 | B2 * | 8/2017 | Kunimasa | B60K 11/04 |
| 9,744,848 | B2 * | 8/2017 | Ho | B60K 11/085 |
| 9,776,579 | B1 * | 10/2017 | Delaney | B60R 13/07 |
| 9,975,419 | B2 * | 5/2018 | Eckstein | B60K 11/02 |
| 10,173,496 | B2 * | 1/2019 | Ho | B60K 11/08 |
| 10,215,120 | B2 * | 2/2019 | Titus | G01S 19/14 |
| 10,470,343 | B2 * | 11/2019 | Shibata | H05K 7/20909 |
| 10,479,193 | B2 * | 11/2019 | Shimizu | B60K 11/04 |
| 10,486,754 | B2 * | 11/2019 | Titus | B62D 37/02 |
| 10,578,364 | B2 * | 3/2020 | Takaishi | B60R 19/48 |
| 10,584,465 | B2 * | 3/2020 | Sakon | B60K 11/02 |
| 10,720,881 | B2 * | 7/2020 | Malek | H01L 31/048 |
| 10,857,872 | B2 * | 12/2020 | Sedlak | B60K 11/085 |
| 11,204,204 | B2 * | 12/2021 | Lee | F01N 1/023 |
| 11,326,838 | B2 * | 5/2022 | Favaretto | B60K 11/08 |
| 11,498,413 | B2 * | 11/2022 | Henon | B60K 11/08 |
| 11,642,933 | B2 * | 5/2023 | Moradnia | B60H 1/00328 165/202 |
| 11,752,830 | B1 * | 9/2023 | Morris | B60H 1/00278 165/44 |
| 2002/0011075 | A1 * | 1/2002 | Faqih | B01D 5/0087 62/285 |
| 2005/0023057 | A1 * | 2/2005 | Maeda | F28F 1/128 180/68.1 |
| 2006/0004898 | A1 | 3/2006 | Bracciano | |
| 2008/0014854 | A1 * | 1/2008 | Tigner | B60H 1/00414 62/331 |
| 2012/0037210 | A1 * | 2/2012 | Lim | F28F 3/02 136/246 |
| 2012/0085587 | A1 * | 4/2012 | Drouin | F03D 3/04 180/2.2 |
| 2018/0048262 | A1 * | 2/2018 | Malek | H02S 40/425 |
| 2018/0208015 | A1 * | 7/2018 | Zhang | B60H 1/00478 |
| 2021/0051821 | A1 * | 2/2021 | Holleczek | G01S 17/86 |
| 2021/0402870 | A1 * | 12/2021 | Moradnia | B62D 25/085 |

FOREIGN PATENT DOCUMENTS

| | | |
|---|---|---|
| DE | 102004019769 A1 | 11/2005 |
| DE | 102008028790 A1 | 12/2009 |
| DE | 102016120459 A1 | 4/2018 |
| DE | 102017200624 A1 | 7/2018 |
| EP | 1713656 B1 | 5/2009 |
| JP | H06191293 A | 7/1994 |
| JP | 2005126029 A | 5/2005 |
| JP | 2010274675 A | 12/2010 |
| KR | 19990002611 A | 1/1999 |
| KR | 20000015657 U | 8/2000 |

* cited by examiner

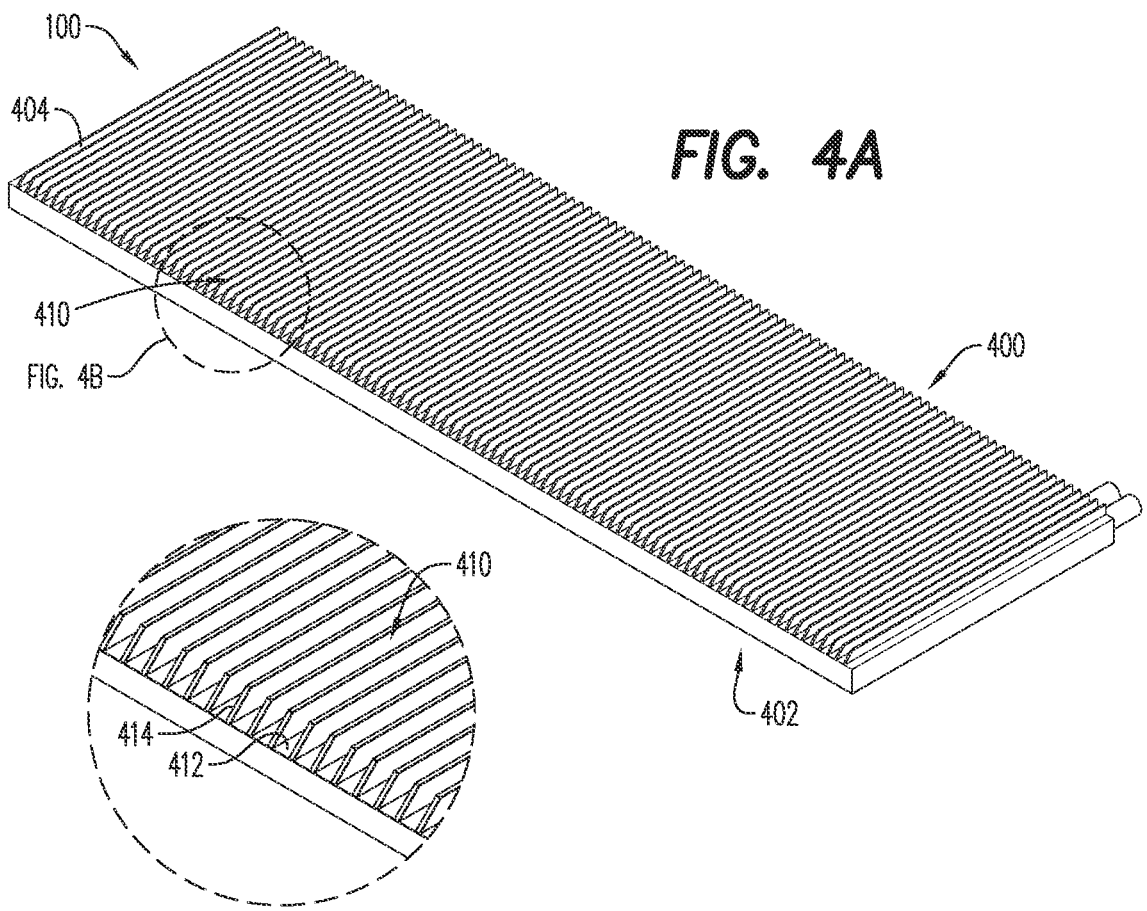
FIG. 4A
FIG. 4B
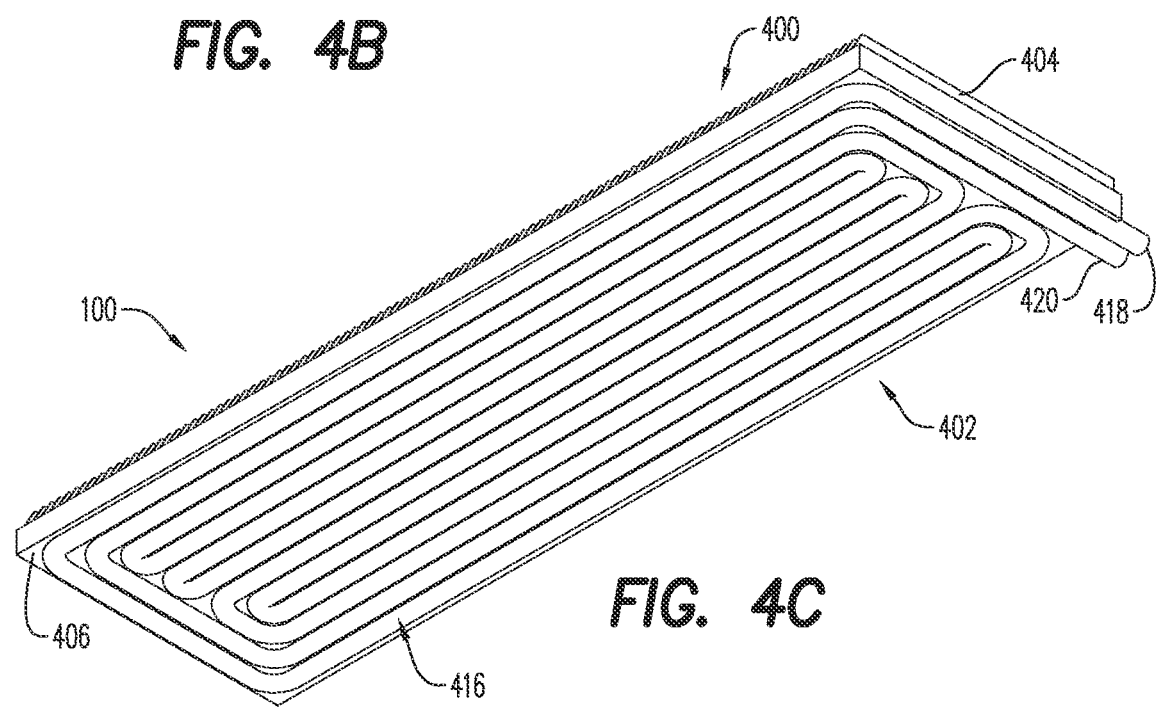
FIG. 4C

US 11,890,923 B2

UPPER BODY HEAT EXCHANGER FOR VEHICLES

CROSS-REFERENCE TO RELATED APPLICATION

This application is a continuation-in-part of pending U.S. patent application Ser. No. 16/910,680 filed on Jun. 24, 2020, the contents of which is hereby incorporated by reference in its entirety.

BACKGROUND

This disclosure relates generally to a heat transfer system for vehicle components, and more particularly, to a heat transfer system including a heat exchanger arranged on a vehicle upper body.

Many vehicle systems and components employ heat transfer systems to help provide cooling or otherwise assist with regulating temperatures. Conventionally, vehicles have traditionally positioned heat exchangers, such as radiators, at the front of the vehicle where they may receive maximum airflow to assist with heat transfer. However, as more vehicle systems and components require or benefit from heat transfer systems, the impact of such heat transfer systems on aerodynamic performance and packaging becomes an important consideration. As a result, conventional heat transfer systems may be limited in their ability to provide sufficient cooling or temperature regulation to vehicle systems and components.

Accordingly, there is a need in the art for an improved heat transfer system.

SUMMARY

In one aspect, an upper body heat exchanger for a vehicle is provided. The upper body heat exchanger includes a first portion comprising a plurality of fins disposed on a first surface of the upper body heat exchanger. The upper body heat exchanger also includes a second portion comprising a plurality of heat transfer fluid passages disposed on a second surface of the upper body heat exchanger. The second portion is disposed beneath the first portion. The upper body heat exchanger is mounted on the vehicle such that the first surface of the first portion of the hood surface heat exchanger is exposed to an exterior of the vehicle. The plurality of heat transfer fluid passages are configured to transfer heat from heated fluid flowing through the plurality of heat transfer fluid passages to airflows interacting with the plurality of fins as the vehicle is moving.

In another aspect, a vehicle fluid coolant system for a vehicle is provided. The vehicle fluid coolant system includes an upper body component of the vehicle having an exterior surface, a first heat exchanger, a heat transfer fluid reservoir, a pump, and a second heat exchanger. The second heat exchanger forms a heat transfer fluid flow circuit with the first heat exchanger, the heat transfer fluid reservoir, and the pump. The second heat exchanger is mounted on the vehicle forming an airflow pathway defined so that air flows along the second heat exchanger and the exterior surface of the upper body component.

In another aspect, a vehicle heat transfer system is provided. The vehicle heat transfer system includes a first upper body component positioned on a forward half of a vehicle. The first upper body component includes an exterior surface and an opposite interior surface. The interior surface defines at least a portion of an internal compartment of the vehicle. The first upper body component includes an opening to the internal compartment. The vehicle heat transfer system also includes a second upper body component positioned rearward of the first upper body component on the vehicle. The second upper body component includes an exterior surface. The vehicle heat transfer system also includes a heat exchanger aligned with the opening in the first upper body component along the length of the vehicle to form an airflow pathway with the exterior surface of the first upper body component. Discharge air from the heat exchanger is directed to flow along the exterior surface of the second upper body component.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 4A is an isometric view of a heat exchanger in accordance with aspects of the present disclosure;

FIG. 4B is an enlarged view of a portion of the heat exchanger shown in FIG. 4A showing a plurality of fins;

FIG. 4C is an isometric underside view of the heat exchanger of FIG. 4A in accordance with aspects of the present disclosure;

DETAILED DESCRIPTION

Embodiments of a heat transfer system for cooling vehicle components that includes a heat exchanger arranged on an upper body of a motor vehicle, in particular, a vehicle hood, are described herein. The techniques of the present embodiments may be used to provide a more efficient solution for cooling and/or regulating temperatures of vehicle systems and components than conventional arrangements.

The example embodiments described herein may be used in connection with a motor vehicle. The term "motor vehicle" as used throughout the specification and claims refers to any moving vehicle that is capable of carrying cargo and/or occupants, and is powered by at least one motor system. The term motor vehicle includes, but is not limited to: cars, trucks, vans, minivans, SUVs, motorcycles, scooters, boats, watercraft, and aircraft. Motor vehicles can include vehicles powered by internal combustion engines, as well as electrified vehicles. Electrified vehicles may include an electric vehicle powered by a battery or fuel cell (i.e., a battery electric vehicle (BEV) or fuel cell vehicle (FCV)) as well as a hybrid electric vehicle powered by an electric motor, generator, or battery in addition to an internal combustion engine (i.e., a hybrid electric vehicle (HEV) or plug-in hybrid electric vehicle (PHEV)).

In various embodiments, a heat exchanger may be positioned on, under, in, through, or adjacent to a vehicle upper body such that air flowing over the upper body also travels over a portion of the heat exchanger that is exposed on the upper body. That is, an airflow pathway is defined such that air flows along the upper body heat exchanger and a surface of the upper body of the vehicle. As used herein, a vehicle upper body is located on a front end of a vehicle between the vehicle fenders in a lateral direction and in front of a windshield or an occupant cabin in a longitudinal direction. It should be understood, however, that in some embodiments a vehicle may not have an occupant cabin, in these embodiments, the vehicle upper body may refer to a portion of the vehicle that faces towards the direction of movement so as to allow air to flow over the vehicle upper body while the vehicle is motion. The example embodiments herein are described and illustrated in reference to a vehicle upper body in the form of a hood of a vehicle. With this arrangement, a heat exchanger positioned on a vehicle upper body may act to cool various systems and/or components of the vehicle.

Figure 1:
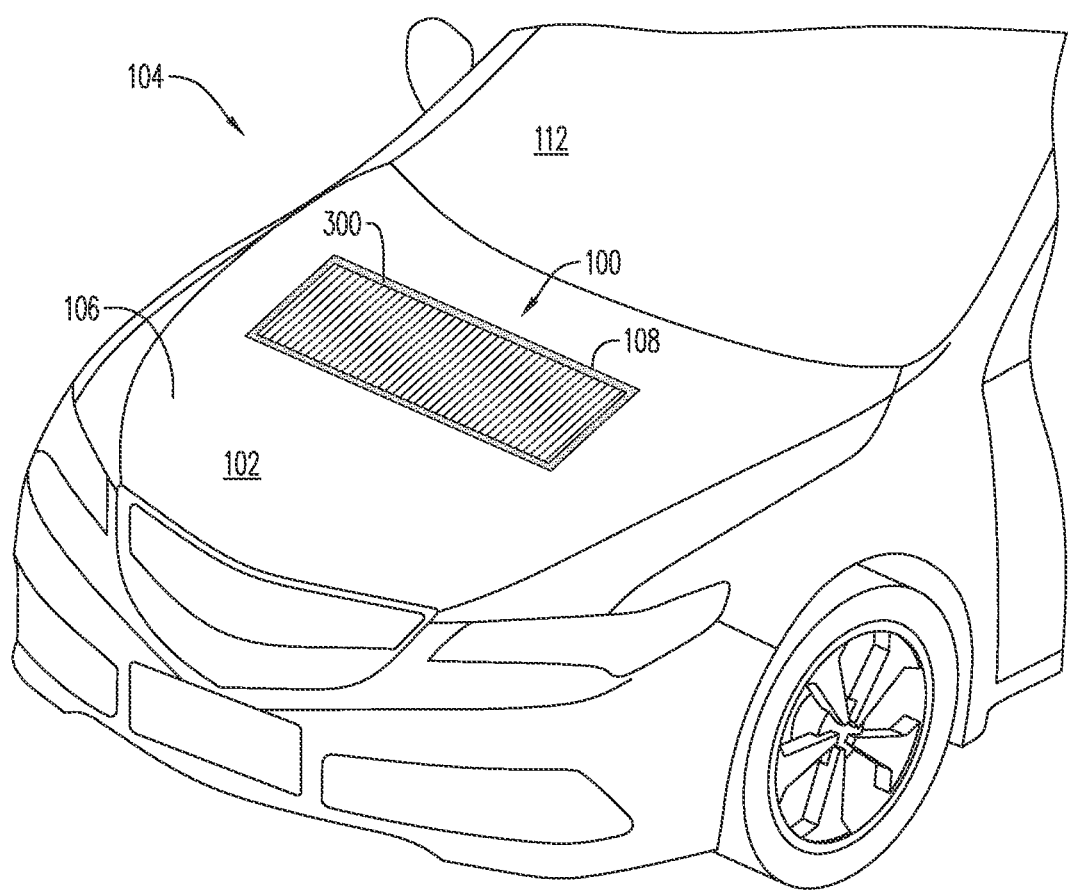
FIG. 1 is a representative view of an example embodiment of a heat exchanger associated with a hood surface of a vehicle in accordance with aspects of the present disclosure.

Referring now to FIG. 1, an example embodiment of a heat exchanger 100 associated with a vehicle upper body, for example, a hood surface 102 of a motor vehicle 104, is shown. In this embodiment, heat exchanger 100 is exposed on hood surface 102 of a hood 106 of vehicle 104 through an opening 108 in hood 106. In an example embodiment, opening 108 in hood 106 of vehicle 104 may have an approximately rectangular shape that corresponds to an approximately rectangular shape of heat exchanger 100. In the example embodiments, heat exchanger 100 is aligned with opening 108 in the vehicle upper body (e.g., hood 106) along a length of vehicle 104.

In this embodiment, heat exchanger 100 is located near a bulkhead 110 (or firewall) of vehicle 104 that separates hood 106 from a windshield 112 of vehicle 104. It should be understood that in other embodiments, including example embodiments described further below, heat exchanger 100 may be positioned or located elsewhere relative to hood surface 102 of vehicle 104. In addition, while the example embodiments illustrate an approximately rectangular shape for heat exchanger 100 and the corresponding opening 108 in hood 106, it should be understood that heat exchanger 100 and/or opening 108 may have any shape.

In some embodiments, the techniques of the example embodiments described herein may be used to provide cooling and/or temperature regulation for a variety of different systems and components associated a vehicle. In an example embodiment, a heat exchanger according to the example embodiments (e.g., heat exchanger 100) may be used as part of a vehicle fluid coolant system to provide supplemental heat transfer capabilities to a vehicle's engine or other driveline components, such as a transmission. Additionally, in some embodiments, the heat exchanger may be used in combination with another heat exchanger, such as a main radiator of a vehicle, to provide additional or supplemental heat transfer functionality. In other embodiments, a heat exchanger may be used in connection with other vehicle systems and/or components that employ heat transfer techniques. For example, in some embodiments, a heat exchanger as described herein may be used as part of an air conditioning or HVAC system to provide supplemental cooling or temperature regulation capacity to a vehicle's interior cabin or passenger compartment. In still other embodiments, a heat exchanger may be used as part of a battery cooling and/or temperature regulation system, for example, in an electric or hybrid vehicle, to provide additional or supplemental heat transfer capabilities to assist with regulating the temperature of the vehicle's batteries, motors, and/or inverters.

Although the heat exchanger described herein may also be referred to as a hood surface radiator or hood surface heat exchanger, it is not limited to the functionality of a conventional radiator. For example, it is possible that in one or more modes of operation, the heat exchanger according to the example embodiments may function as a condenser in a cooling circuit, or an evaporator in a heating circuit.

Figure 2:
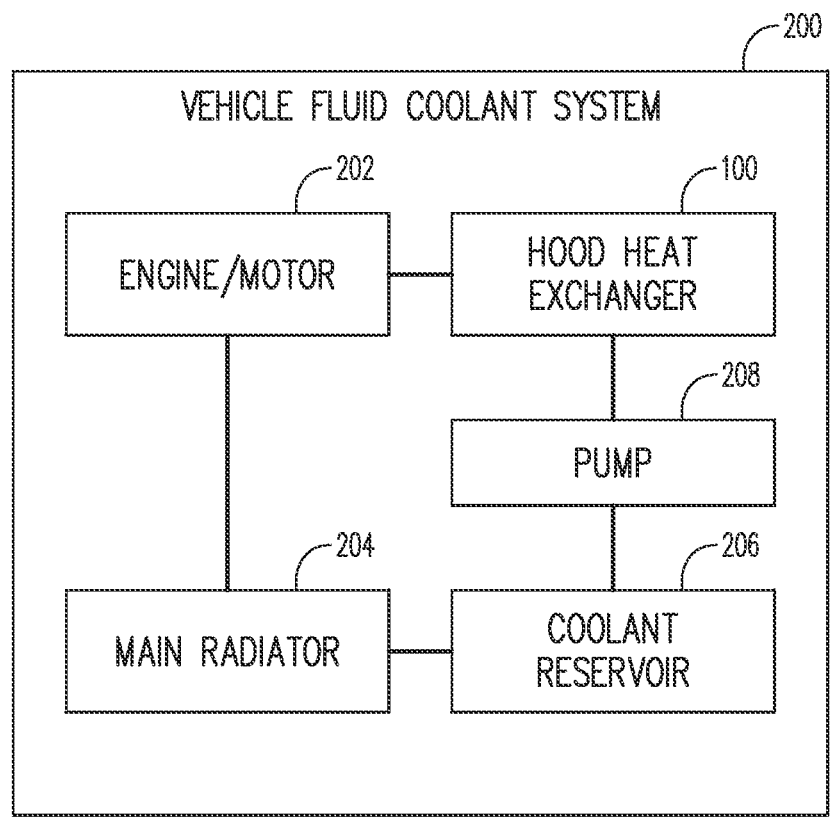
FIG. 2 is a block system diagram of an example embodiment of a heat transfer system for a vehicle fluid coolant system in accordance with aspects of the present disclosure.

Referring now to FIG. 2, an example embodiment of a heat transfer system for a vehicle fluid coolant system 200 in accordance with aspects of the present disclosure is shown. In this embodiment, heat exchanger 100 associated with hood surface 102 of vehicle 104 (as shown in FIG. 1) may be part of vehicle fluid coolant system 200. In an example embodiment, vehicle fluid coolant system 200 may be configured to provide cooling and/or temperature regulation to a vehicle engine or motor 202. Vehicle fluid coolant system 200 may also include at least a first heat exchanger, for example, a main radiator 204, and a heat transfer fluid reservoir, for example, a coolant reservoir 206. Main radiator 204 is configured to provide the primary heat transfer function to help regulate the temperature of engine/motor 202. For example, main radiator 204 may typically be located at the front of the vehicle and arranged such that air passes through front grille openings at the front of the vehicle to flow through main radiator 204 in a crossflow or substantially perpendicular manner.

In an example embodiment, vehicle fluid coolant system 200 employs a heat transfer fluid of some type, such as a fluid commonly referred to as engine coolant or antifreeze. Engine coolant or antifreeze may include several different varieties of ingredients, but generally may include ethylene or propylene glycol and water. In other embodiments, other types of heat transfer fluid may be used, for example, depending on the type of heat transfer system. For example, an air conditioning system may use Freon, R-134A, or other types of refrigerants for a heat transfer fluid. Other embodiments may similarly use heat transfer fluids that are specific to the particular configuration of the heat transfer system.

In this embodiment, the coolant used as the heat transfer fluid for vehicle fluid coolant system 200 may be stored or held in a coolant reservoir 206. Coolant reservoir 206 may be a container of any type or shape within the engine compartment or other location on the vehicle that is configured to hold or store the coolant or other heat transfer fluid used by vehicle fluid coolant system 200. Additionally, in an example embodiment, vehicle fluid coolant system 200 may also include at least one pump 208 that is configured to move the coolant through vehicle fluid coolant system 200 so that the coolant circulates through each of the components, including, but not limited to engine/motor 202, main radiator 204, coolant reservoir 206, and surface hood heat exchanger 100.

For example, by way of action of pump 208, coolant may move through vehicle fluid coolant system 200 from coolant reservoir 206 through various fluid conduits and passages (not shown) that are in fluid communication with engine/motor 202, main radiator 204, coolant reservoir 206, and surface hood heat exchanger 100. Coolant passing through engine/motor 202 absorbs heat from the components of engine/motor 202 and passes to main radiator 204 and surface hood heat exchanger 100 where the heated coolant transfers the absorbed heat to the cooler surrounding atmosphere, thereby cooling the coolant. The cooled coolant returns back to the coolant reservoir 206 where it may be cycled back through engine/motor 202 to once again absorb heat. With this arrangement, vehicle fluid coolant system 200 may act to transfer heat from engine/motor 202 or other components for cooling and/or temperature regulation.

Figure 3:
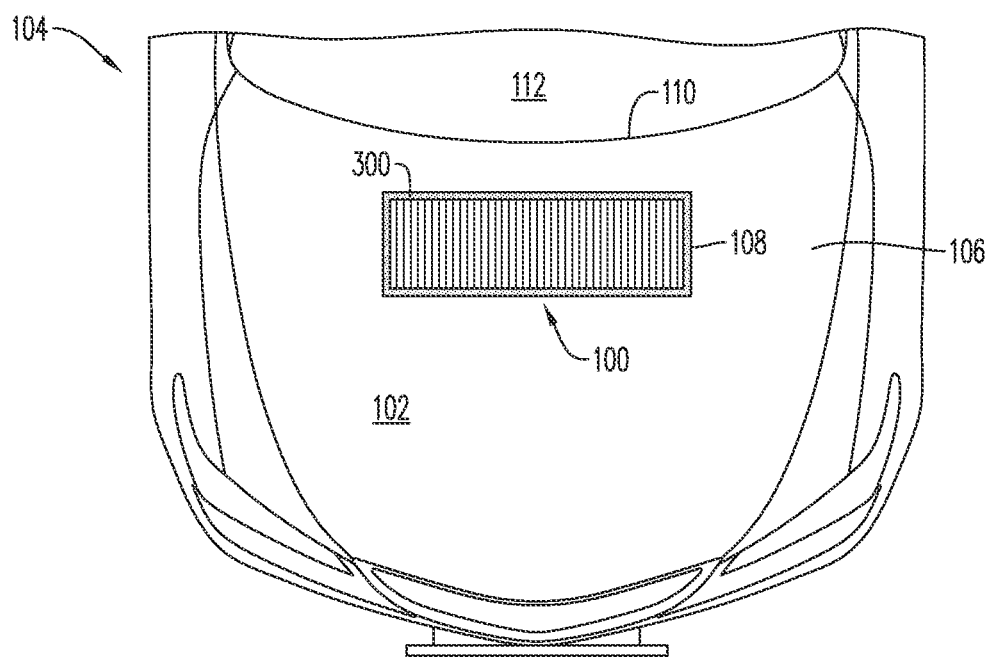
FIG. 3 is a top view of an example embodiment of a heat exchanger associated with a hood surface of a vehicle in accordance with aspects of the present disclosure.

Referring now to FIG. 3, a top view of heat exchanger 100 associated with hood surface 102 of vehicle 104 is shown. In this embodiment, hood surface heat exchanger 100 is shown exposed on hood surface 102 through opening 108 on hood 106 of vehicle 104. As described above, in one embodiment, opening 108 has an approximately rectangular shape that corresponds to the approximately rectangular shape of heat exchanger 100. It is possible that the opening and heat exchanger may be of a different shape that correspond to one another. In some embodiments, hood 106 of vehicle 104 may be provided with a gasket 300 or other sealing mechanism that surrounds opening 108 to provide a seal or barrier that prevents water or other objects (e.g., dirt, debris, etc.) from entering into the engine compartment beneath hood 106. In this embodiment, gasket 300 extends around the perimeter of rectangular opening 108 in hood 106 and provides a seal between heat exchanger 100 and hood 106 on hood surface 102.

Referring now to FIGS. 4A-4C, an example embodiment of hood surface heat exchanger 100 having an approximately rectangular shape is shown. FIG. 4A is an isometric top view showing heat exchanger 100 in greater detail. In one embodiment, heat exchanger 100 is made from aluminum, but other materials could of course also be used. FIG. 4A shows a top portion 400 of heat exchanger 100 including an outer surface 404 that is disposed opposite a bottom portion 402 including an inner surface 406.

In an example embodiment, outer surface 404 of heat exchanger 100 includes a plurality of upstanding, outwardly projecting members or fins 410 which assist in maximizing the air flow surface area over heat exchanger 100. As shown in FIG. 4A, plurality of fins 410 define straight, continuous members that are generally parallel to one another and have a predetermined spacing therebetween.

Referring now to FIG. 4B, an enlarged view of plurality of fins 410 is shown. In this embodiment, adjacent fins of plurality of fins 410 are separated by a channel of a plurality of channels 412. In an example embodiment, plurality of fins 410 are substantially aligned along a direction corresponding to an airflow direction of air moving along hood surface 102 of vehicle 104 as vehicle 104 moves.

Fins 410 may be cast aluminum but other materials and/or manufacturing processes, such as extruding and machining, could also be used. In order to further reduce drag, a front or leading edge 414 of each fin of plurality of fins 410 may have an angled configuration to guide the air flow across outer surface 404 of heat exchanger 100 in a smooth manner (i.e., so as to not disrupt the airflow and cause air resistance). With this arrangement, reducing the drag, including the drag over heat exchanger 100, thereby increases the aerodynamic performance of vehicle 104. In some embodiments, a rear or trailing edge of fins 410 (e.g., opposite leading edge 414) may have a square perpendicular edge.

FIG. 4C is an isometric underside or bottom view showing heat exchanger 100 in greater detail. In this embodiment, bottom portion 402 of heat exchanger 100 including inner surface 406 is shown. In an example embodiment, inner surface 406 includes a plurality of heat transfer fluid passages 416. Plurality of fluid passages 416 may one or more tubes or other conduits that are arranged along bottom portion 402 of heat exchanger 100. Plurality of heat transfer fluid passages 416 are configured for the heat transfer fluid or cooling fluid (e.g., coolant) to flow through as air passes over fins 410 on top portion 400 of heat exchanger 100.

As shown in the illustrated embodiment of FIG. 4C, fluid passages 416 are arranged in an approximately serpentine pattern on bottom portion 402 of heat exchanger 100 and guide the cooling fluid via an inlet 418 to an outlet 420 forming a cooling fluid flow circuit configured to transfer heat from the cooling fluid to oncoming air passing over plurality of fins 410 located above fluid passages 416 on top portion 400 of heat exchanger 100 while the vehicle (e.g., vehicle 104) is in motion.

When installed on vehicle 104, inner surface 406 of heat exchanger 100 will be facing towards the interior of the vehicle (e.g., towards the engine compartment) and outer surface 404 of heat exchanger 100 will be facing away from vehicle 104 (e.g., away from the engine compartment). That is, outer surface 404, including plurality of fins 410 is exposed on the hood surface (e.g., hood surface 102 of vehicle 104) on the exterior of the vehicle. With this arrangement, plurality of fins 410 may act to transfer heat from the cooling fluid flowing through fluid passages 416 to air moving along hood surface 102, thereby providing additional or supplemental cooling or temperature regulation to vehicle systems and/or components, for example, vehicle fluid coolant system 200, described above.

In various embodiments, a hood surface heat exchanger according to the techniques described herein (e.g., heat exchanger 100, described above) may be mounted or attached on the vehicle relative to the upper body or hood of the vehicle in different ways so that the heat exchanger is exposed on the surface of the vehicle upper body or hood. For example, as will be described below in reference to FIGS. 5-7, an example embodiment of a heat exchanger that is mounted or attached on the vehicle upper body, for example, the hood itself is shown. In other embodiments, the heat exchanger may be secured to the vehicle body by being mounted or attached by a support structure in the vehicle's engine compartment that positions the heat exchanger so that it extends through an opening the vehicle's hood, but is not fixedly attached directly to the hood. For example, as will be described below in reference to FIGS. 8-18, different example embodiments of a heat exchanger that is mounted in an engine compartment of a vehicle are shown. As such, embodiments of a heat exchanger fixed to the vehicle body, such as by being mounted within the engine compartment or other area, do not move when the hood or vehicle upper body is moved.

Figure 5:
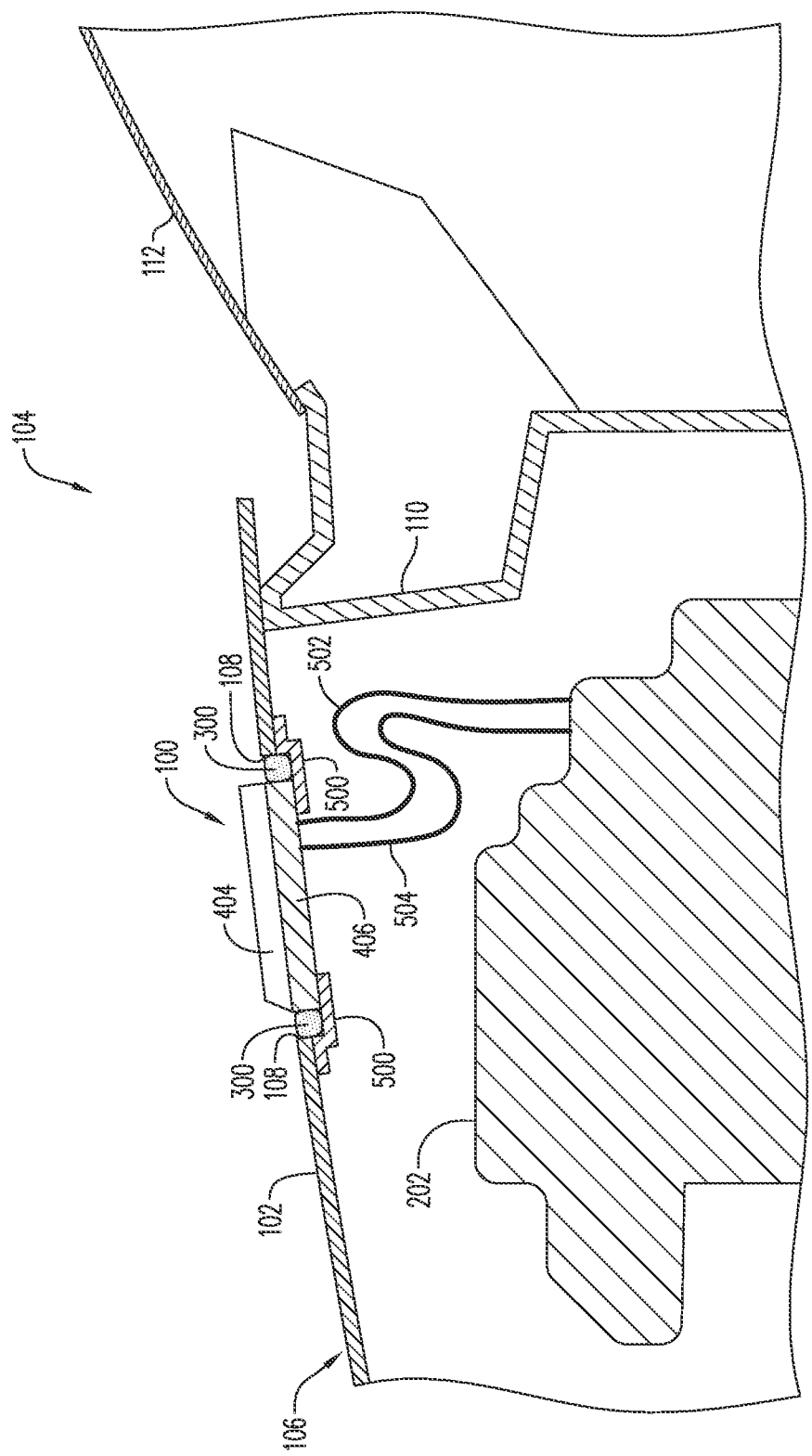
FIG. 5 is a representative side cross-section view of an example embodiment of a hood-mounted heat exchanger in accordance with aspects of the present disclosure.
Figure 6:
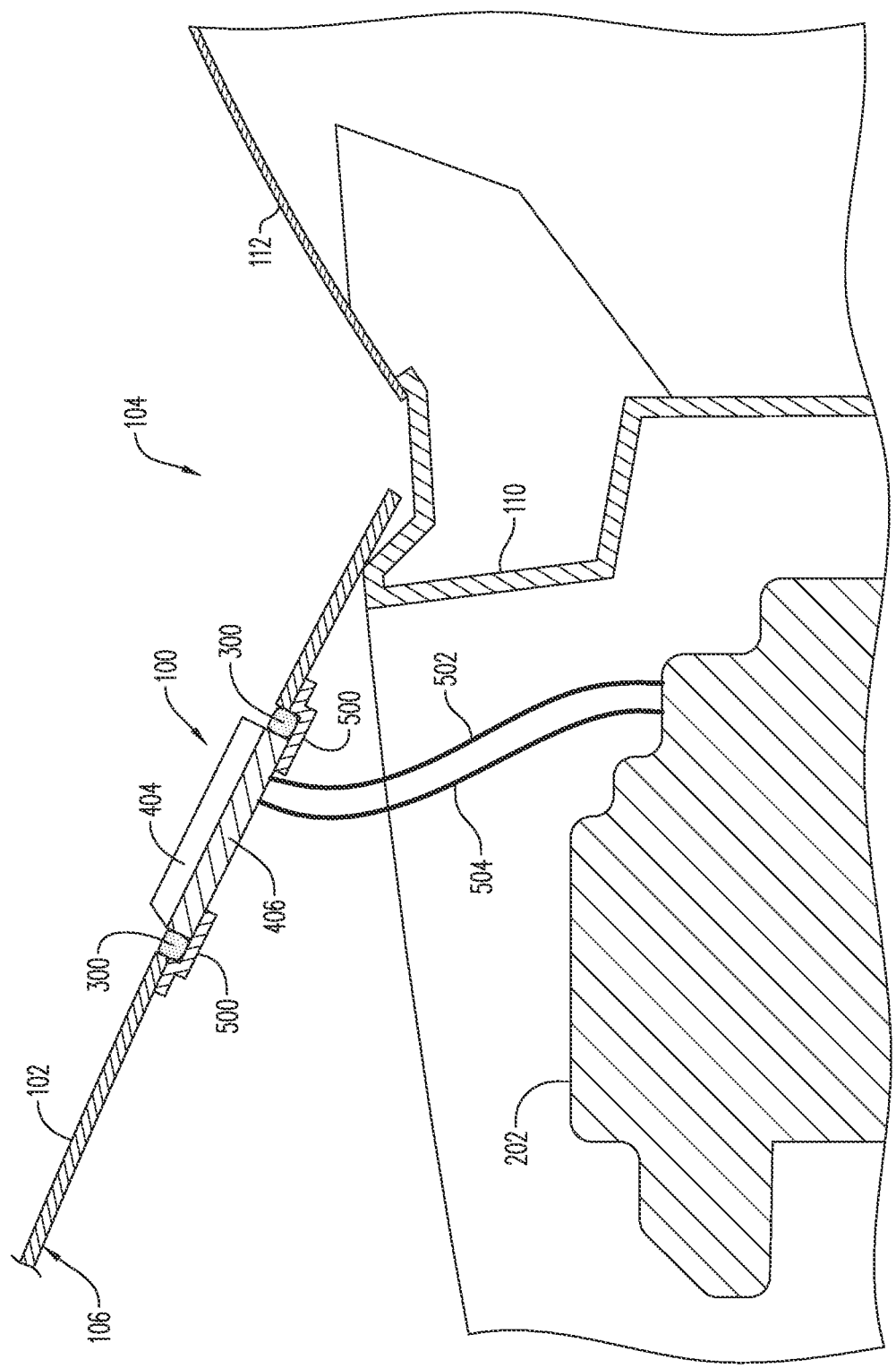
FIG. 6 is a representative side cross-section view of the example embodiment of the hood-mounted heat exchanger of FIG. 5 shown with the vehicle hood in an open position in accordance with aspects of the present disclosure.
Figure 7:
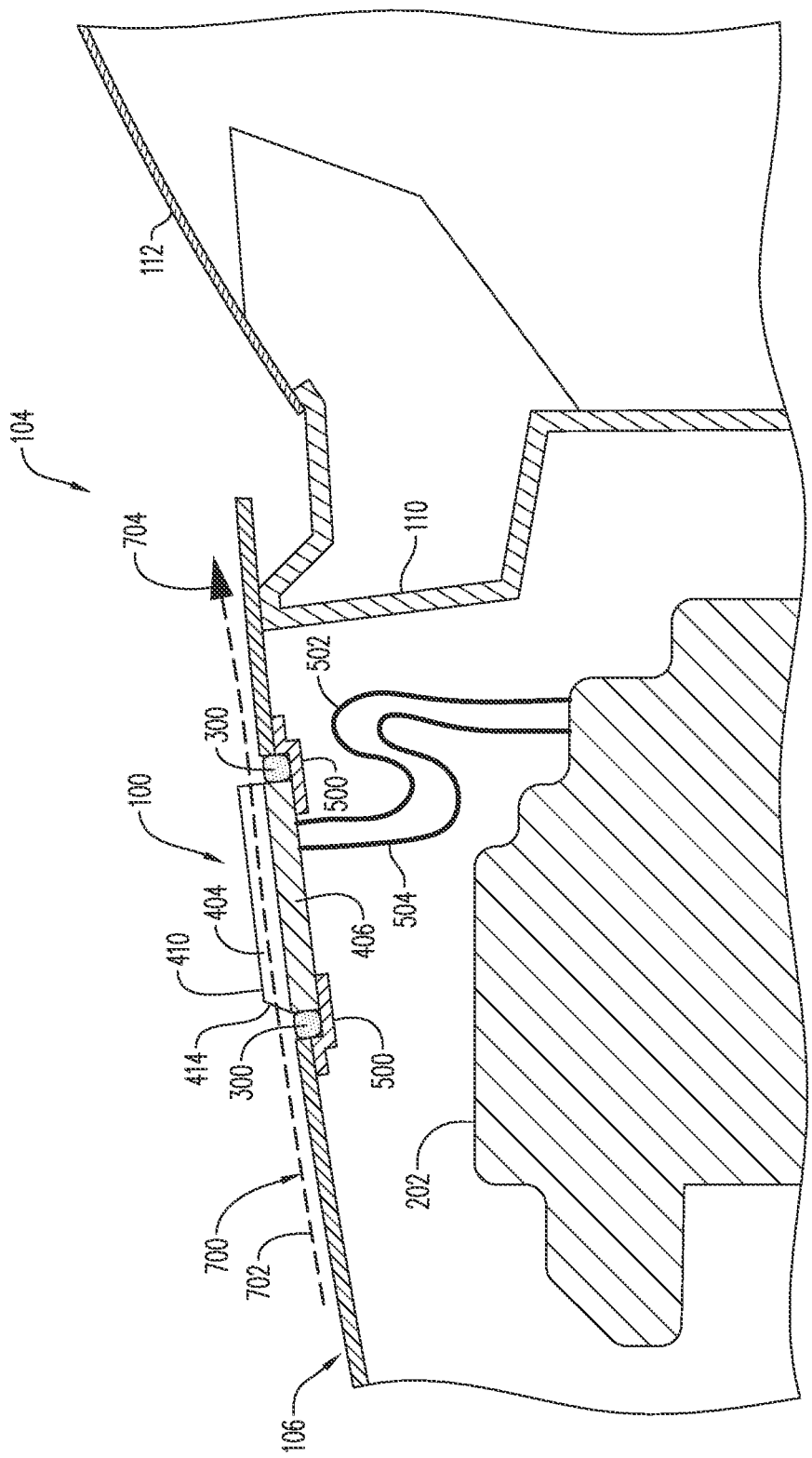
FIG. 7 is a representative side cross-section view showing airflow along the example embodiment of the hood-mounted heat exchanger of FIG. 5 in accordance with aspects of the present disclosure.

Referring now to FIGS. 5-7, an example embodiment of a heat exchanger (e.g., heat exchanger 100, described above) is shown mounted or attached to a vehicle upper body, for example, hood 106 of vehicle 104. FIG. 5 is a side cross-section view of a hood-mounted heat exchanger 100 in accordance with aspects of the present disclosure. In this embodiment, heat exchanger 100 is mounted directly on the vehicle upper body, for example, hood 106 of vehicle 104. For example, one more mounting brackets 500 may extend under heat exchanger 100 on the bottom side of hood 106 to attach heat exchanger 100 to hood 106. As shown in this embodiment, heat exchanger 100 is mounted on hood 106 so that inner surface 406 of heat exchanger 100 is facing towards an internal compartment of the vehicle, for example, the engine compartment where engine/motor 202 is located in this embodiment, and outer surface 404 of heat exchanger 100 extends through opening 108 so as to be exposed on hood surface 102 of hood 106. In this embodiment, gasket 300 extends around the perimeter of opening 108 in hood 106 to seal opening 108 and prevent water and/or debris or other objects from entering into the engine compartment.

In an example embodiment, heat exchanger 100 may be in fluid communication with at least one system or component of vehicle 104 in order to provide heat transfer for additional or supplemental cooling or assistance with temperature regulation. In this embodiment, a pair of coolant lines, including an intake line 502 and an output line 504 are shown in connection with heat exchanger 100. For example, as shown in FIG. 4C above, intake line 502 may supply heated fluid (e.g., coolant) from vehicle fluid coolant system 200 to inlet 418 on bottom portion 402 of heat exchanger 100. Similarly, output line 504 may return cooled fluid (e.g., coolant) back to vehicle fluid coolant system 200 from outlet 420 on bottom portion 402 of heat exchanger 100 after having passed through plurality of heat transfer fluid passages 416, described above.

In the embodiment shown in FIG. 5, hood 106 of vehicle 104 is shown in a closed position. FIG. 6. Illustrates a side cross-section view of the example embodiment of the hood-mounted heat exchanger of FIG. 5 shown with the vehicle hood 106 in an open position. As can be seen in FIG. 6, heat exchanger 100 is mounted directly to hood 106, for example, by mounting bracket 500 disposed under hood 106 and extending out from the perimeter of opening 108 so as to provide a lip or ledge that supports heat exchanger 100 within opening 108. Mounting bracket 500 may be fastened or attached to a portion of the underside of hood 106 adjacent to opening 108 and may also be attached or connected (e.g., using fasteners or adhesive) to a perimeter along bottom portion 402 of heat exchanger 100 to securely retain heat exchanger 100 within opening 108 so that when hood 106 is in the open position (as shown in FIG. 6), heat exchanger 100 moves upwards along with hood 106 of vehicle 104.

Referring now to FIG. 7, a side cross-section view showing airflow 700 along the example embodiment of hood-mounted heat exchanger 100 of FIG. 5 in accordance with aspects of the present disclosure is illustrated. In a non-limiting example, hood surface heat exchanger 100 may operate to transfer heat between a working fluid (e.g., coolant) and airflow 700 that is predominantly parallel to a feature of heat exchanger 100 outer surface 404. The working fluid may be part of a closed fluid path that exchanges heat with the vehicle component, for example, as part of vehicle fluid coolant system 200, described above. The feature of heat exchanger 100 outer surface 404 may be shaped, with fins or the like, to balance heat exchange efficiency with surface drag.

As shown in FIG. 7, one or more fins of plurality of fins 410 on outer surface 404 of heat exchanger 100 are exposed on an exterior surface of the vehicle upper body, for example, hood surface 102 of hood 106 of vehicle 104, and are in the path of airflow 700 as vehicle 104 is moving. In an example embodiment, heat exchanger 100 is positioned on hood 106 with the front or leading edge 414 of each fin of plurality of fins 410 facing towards the direction of the oncoming airflow 700 and the trailing edge of each fin of plurality of fins 410 is located on the opposite side (e.g., closer to windshield 112 of vehicle 104 than leading edge 414).

With this arrangement, a first portion 702 of airflow 700 interacts with fins 410 of heat exchanger 100 to transfer heat from heat exchanger 100 (e.g., via heated coolant flowing through plurality of heat transfer fluid passages 416 on bottom portion 402 of heat exchanger 100) to airflow 700. After having passed through fins 410, a second portion 704 of airflow 700 has absorbed a portion of the heat from heat exchanger 100 such that second portion 704 of airflow 700 is warmer than first portion 702. Through this mechanism, the fluid in heat exchanger 100 is cooled by action of heat transfer to airflow 700, thereby cooling the fluid (e.g., coolant), which is returned back to the corresponding vehicle system or component (e.g., vehicle fluid coolant system 200, described above).

That is, in this embodiment, an airflow pathway of airflow 700 is directed along the exterior surface of a first upper body component of the vehicle, for example, hood surface 102 of hood 106 of vehicle 104, to interact with heat exchanger 100 (i.e., first portion 702 of airflow 700) and discharge airflow (i.e., second portion 704 of airflow 700) is directed to flow along an exterior surface of a second upper body component of the vehicle, for example, windshield 112 of vehicle 104.

As described above, in some embodiments, a heat exchanger (e.g., heat exchanger 100) may be mounted or attached by a support structure in the vehicle's engine compartment in a manner that positions the heat exchanger so that it extends through an opening the vehicle's hood, but is not fixedly attached directly to the hood (e.g., as in the previous embodiment shown in FIGS. 5-7).

Figure 8:
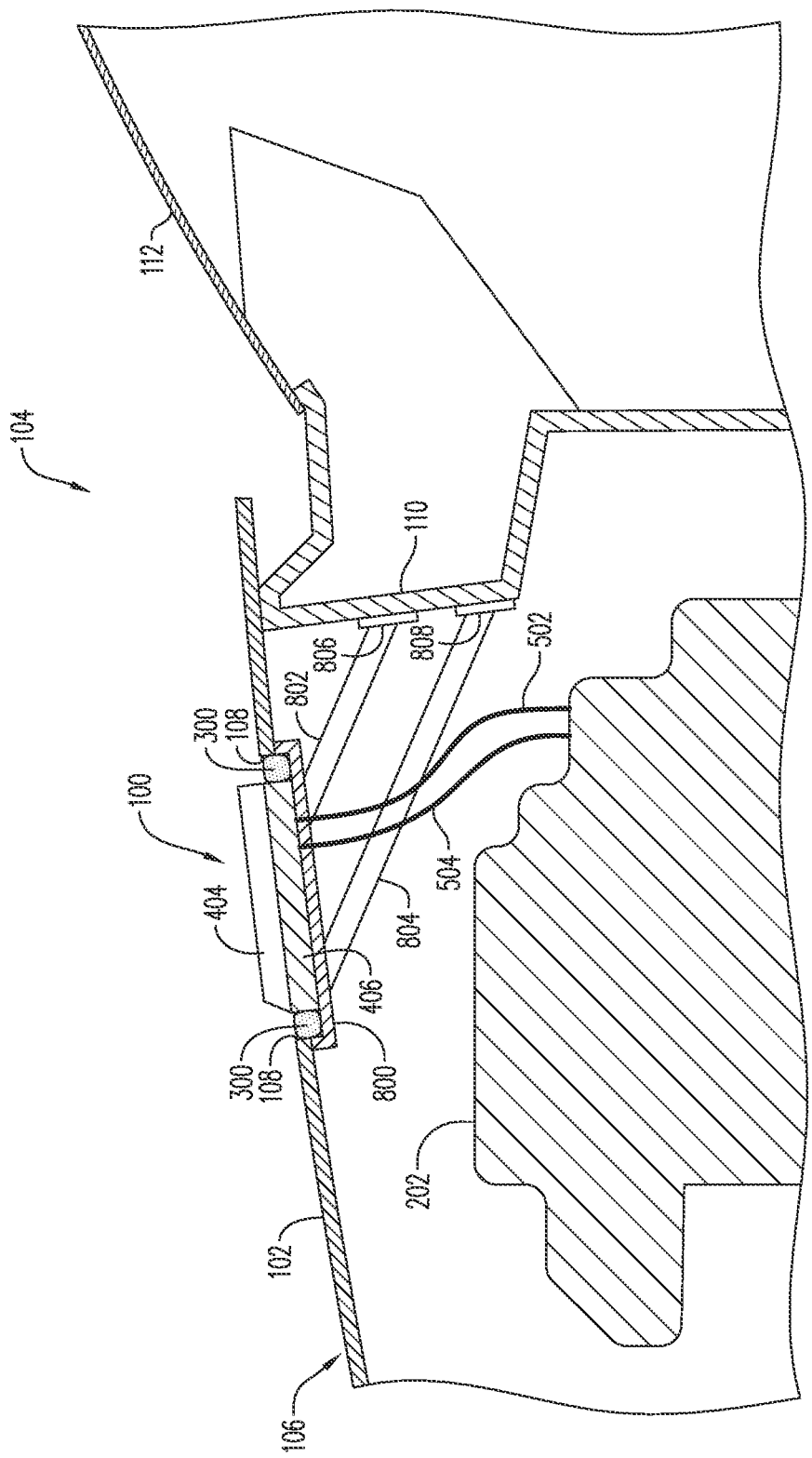
FIG. 8 is a representative side cross-section view of an example embodiment of an engine compartment-mounted heat exchanger in accordance with aspects of the present disclosure.
Figure 9:
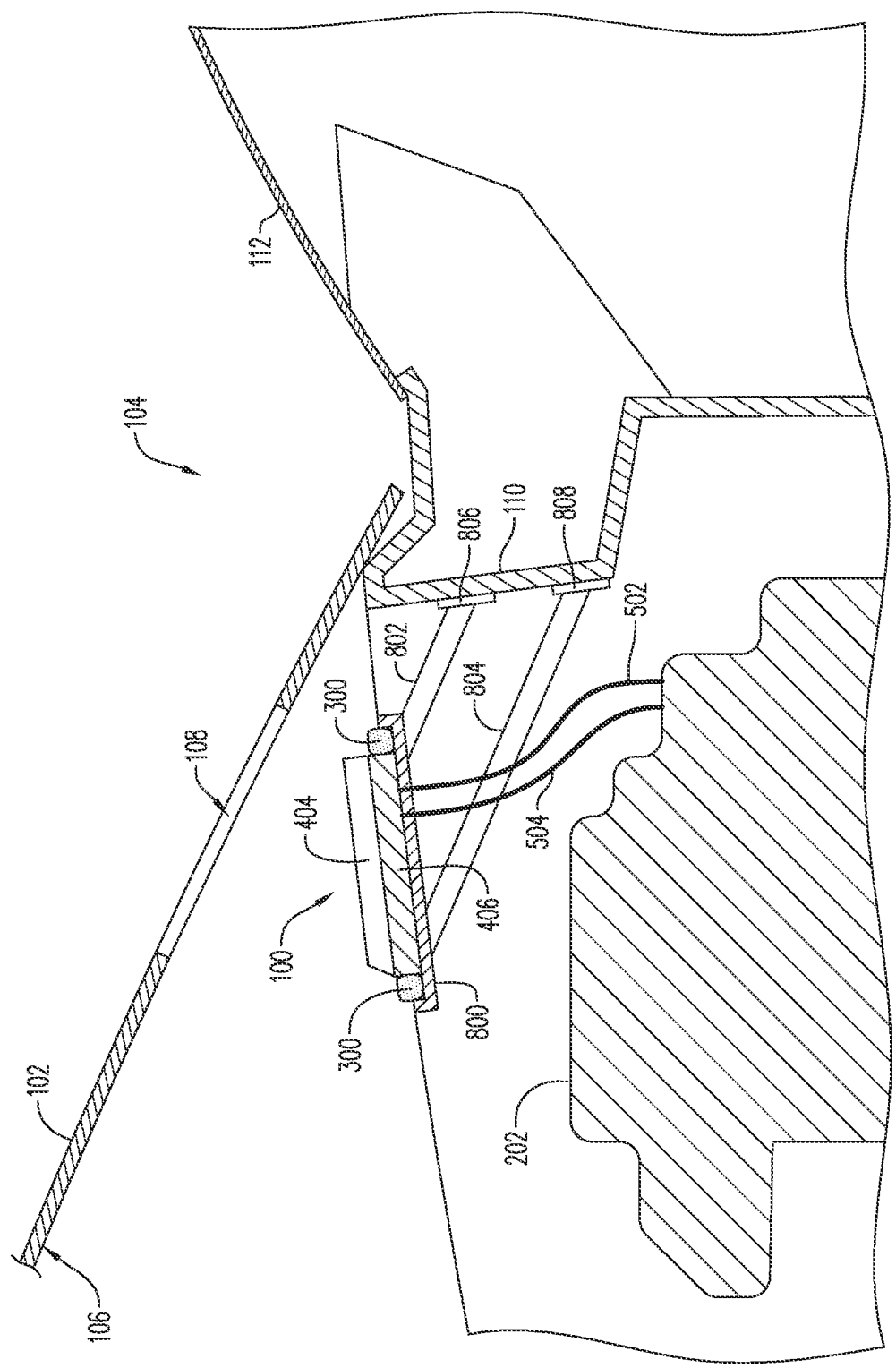
FIG. 9 is a representative side cross-section view of the example embodiment of the engine compartment-mounted heat exchanger of FIG. 8 shown with the vehicle hood in an open position in accordance with aspects of the present disclosure.
Figure 10:
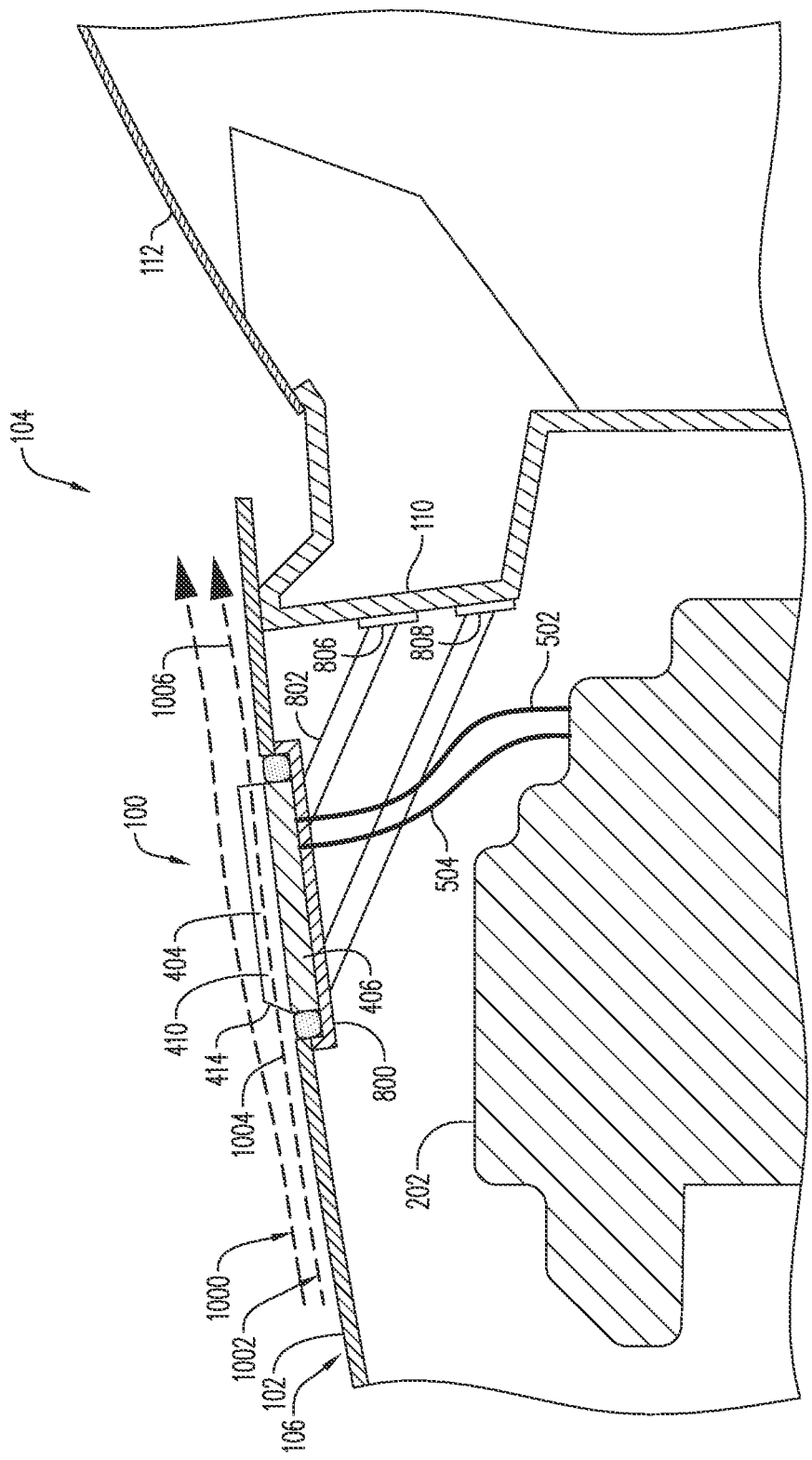
FIG. 10 is a representative side cross-section view showing airflow along the example embodiment of the engine compartment-mounted heat exchanger of FIG. 8 in accordance with aspects of the present disclosure.

FIGS. 8-10 illustrate an example embodiment of an engine compartment-mounted heat exchanger in accordance with aspects of the present disclosure. Referring now to FIG. 8, a side cross-section view of engine compartment-mounted heat exchanger 100 is shown. In this embodiment, heat exchanger 100 is mounted inside the engine compartment beneath hood 106 of vehicle 104. For example, a support element 800 may be configured with a size and shape that corresponds to the size and shape of heat exchanger 100 so as to hold heat exchanger 100 in a position to extend through opening 108 in hood 106 of vehicle 104. In this manner, a portion of heat exchanger (e.g., outer surface 404) may be exposed on hood surface 102 of vehicle 104.

In some embodiments, one or more support arms, including a first support arm 802 and a second support arm 804, may be used to hold support element 800 and heat exchanger 100 in the desired position within opening 108 of hood 106 of vehicle 104. The support arms are attached at one end to support element 800, for example, along a bottom portion of support element 800, and at an opposite end to a structure within the engine compartment of vehicle 104. In this embodiment, first support arm 802 and second support arm 804 are attached to bulkhead 110 of vehicle 104 at their opposite ends using a first bracket 806 and a second bracket 808, respectively, to fixedly attach first support arm 802 and second support arm 804 to bulkhead 110. With this arrangement, heat exchanger 100 may be mounted within the engine compartment of vehicle 104.

As shown in this embodiment, heat exchanger 100 is mounted within the engine compartment of vehicle 104 so that inner surface 406 of heat exchanger 100 is facing towards the engine compartment where engine/motor 202 is located and outer surface 404 of heat exchanger 100 extends through opening 108 in hood 106 so as to be exposed on hood surface 102. In this embodiment, gasket 300 extends around the perimeter of opening 108 in hood 106 to seal opening 108 and prevent water and/or debris or other objects from entering into the engine compartment.

As previously described above, heat exchanger 100 may be in fluid communication with at least one system or component of vehicle 104 in order to provide heat transfer for additional or supplemental cooling or assistance with temperature regulation. In this embodiment, a pair of coolant lines, including intake line 502 and output line 504 are shown in connection with heat exchanger 100. With this arrangement, intake line 502 may supply heated fluid (e.g., coolant) from vehicle fluid coolant system 200 to inlet 418 on bottom portion 402 of heat exchanger 100 and output line 504 may return cooled fluid (e.g., coolant) back to vehicle fluid coolant system 200 from outlet 420 on bottom portion 402 of heat exchanger 100 after having passed through plurality of heat transfer fluid passages 416, as described above.

In FIG. 8, hood 106 of vehicle 104 was illustrated in a closed position. FIG. 9 is cross-section view of the example embodiment of the engine compartment-mounted heat exchanger of FIG. 8 shown with the vehicle hood in an open position. As can be seen in FIG. 9, heat exchanger 100 is fixedly mounted within the engine compartment, for example, by support element 800, first support arm 802, second support arm 804, first bracket 806, and second bracket 808, which components are all disposed beneath hood 106. With this arrangement, when hood 106 is in the open position (as shown in FIG. 9), heat exchanger 100 remains in the same position as hood 106 moves upwards. That is, in contrast to FIG. 6, where heat exchanger 100 is mounted directly to hood 106 and moves along with hood 106 when in the open position.

Referring now to FIG. 10, a side cross-section view showing airflow along the example embodiment of the engine compartment-mounted heat exchanger of FIG. 8 is shown in accordance with aspects of the present disclosure. In this embodiment, one or more fins of plurality of fins 410 on outer surface 404 of heat exchanger 100 are exposed on hood surface 102 of hood 106 of vehicle 104 and are in the path of airflows 1000, 1002 as vehicle 104 is moving. In an example embodiment, heat exchanger 100 is positioned on hood 106 with the front or leading edge 414 of each fin of plurality of fins 410 facing towards the direction of the oncoming airflows 1000, 1002 and the trailing edge of each fin of plurality of fins 410 is located on the opposite side (e.g., closer to windshield 112 of vehicle 104 than leading edge 414). In this embodiment, airflow 1000 travels over the top of heat exchanger 100 (e.g., above fins 410 on outer surface 404), while airflow 1002 travels along hood surface 102 and passes through a portion of heat exchanger 100 (e.g., through fins 410 on outer surface 404).

With this arrangement, a first portion 1004 of airflow 1002 interacts with fins 410 of heat exchanger 100 to transfer heat from heat exchanger 100 (e.g., via heated coolant flowing through plurality of heat transfer fluid passages 416 on bottom portion 402 of heat exchanger 100) to airflow 1002. After having passed through fins 410, a second portion 1006 of airflow 1002 has absorbed a portion of the heat from heat exchanger 100 such that second portion 1006 of airflow 1002 is warmer than first portion 1004. Through this mechanism, the fluid in heat exchanger 100 is cooled by action of heat transfer to airflow 1002, thereby cooling the fluid (e.g., coolant), which is returned back to the corresponding vehicle system or component (e.g., vehicle fluid coolant system 200, described above).

That is, in this embodiment, an airflow pathway of airflow 1002 is directed along the exterior surface of a first upper body component of the vehicle, for example, hood surface 102 of hood 106 of vehicle 104, to interact with heat exchanger 100 (i.e., first portion 1004 of airflow 1002) and discharge airflow (i.e., second portion 1006 of airflow 1002) is directed to flow along an exterior surface of a second upper body component of the vehicle, for example, windshield 112 of vehicle 104.

Figure 11:
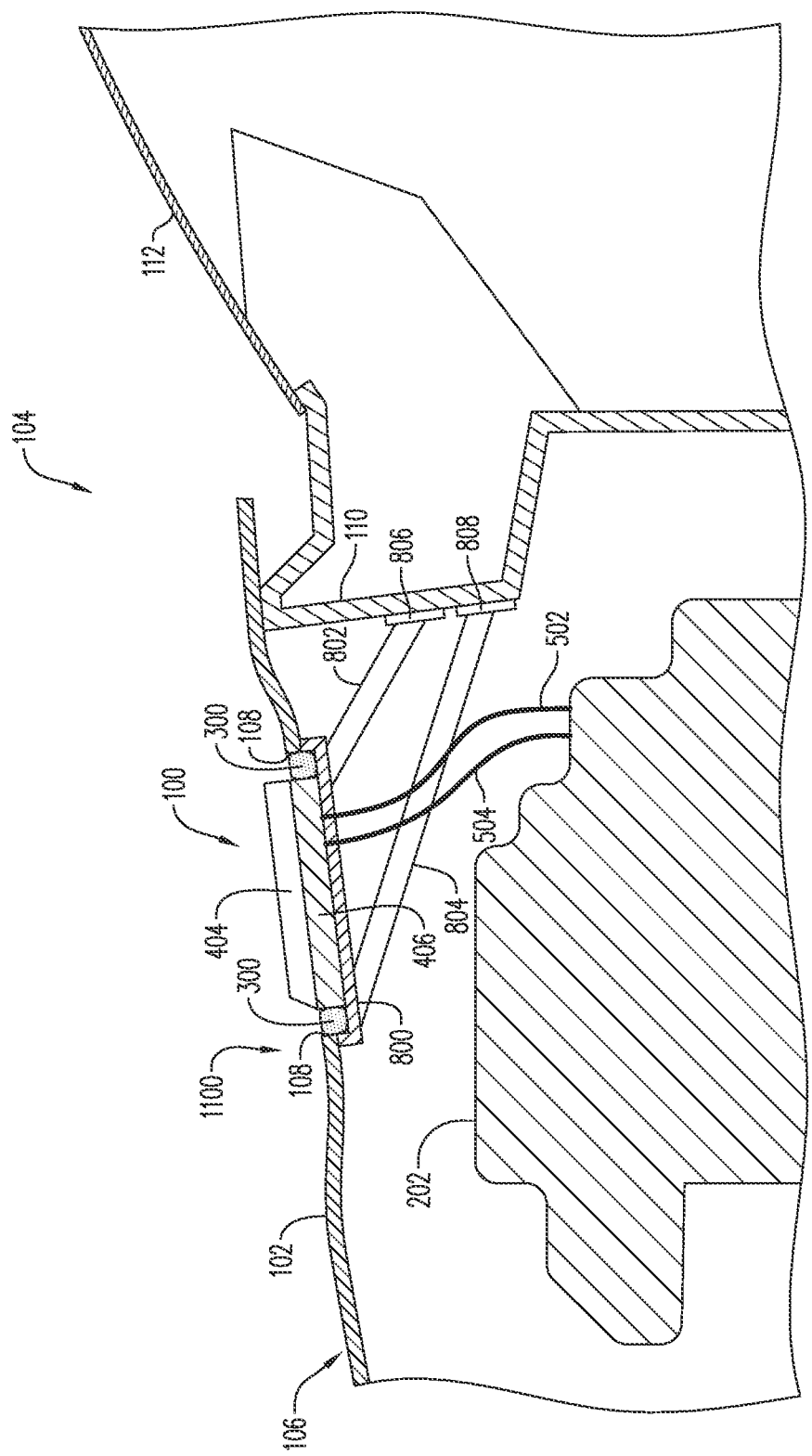
FIG. 11 is a representative side cross-section view of another embodiment of an engine compartment-mounted heat exchanger disposed in a hood recess in accordance with aspects of the present disclosure.
Figure 12:
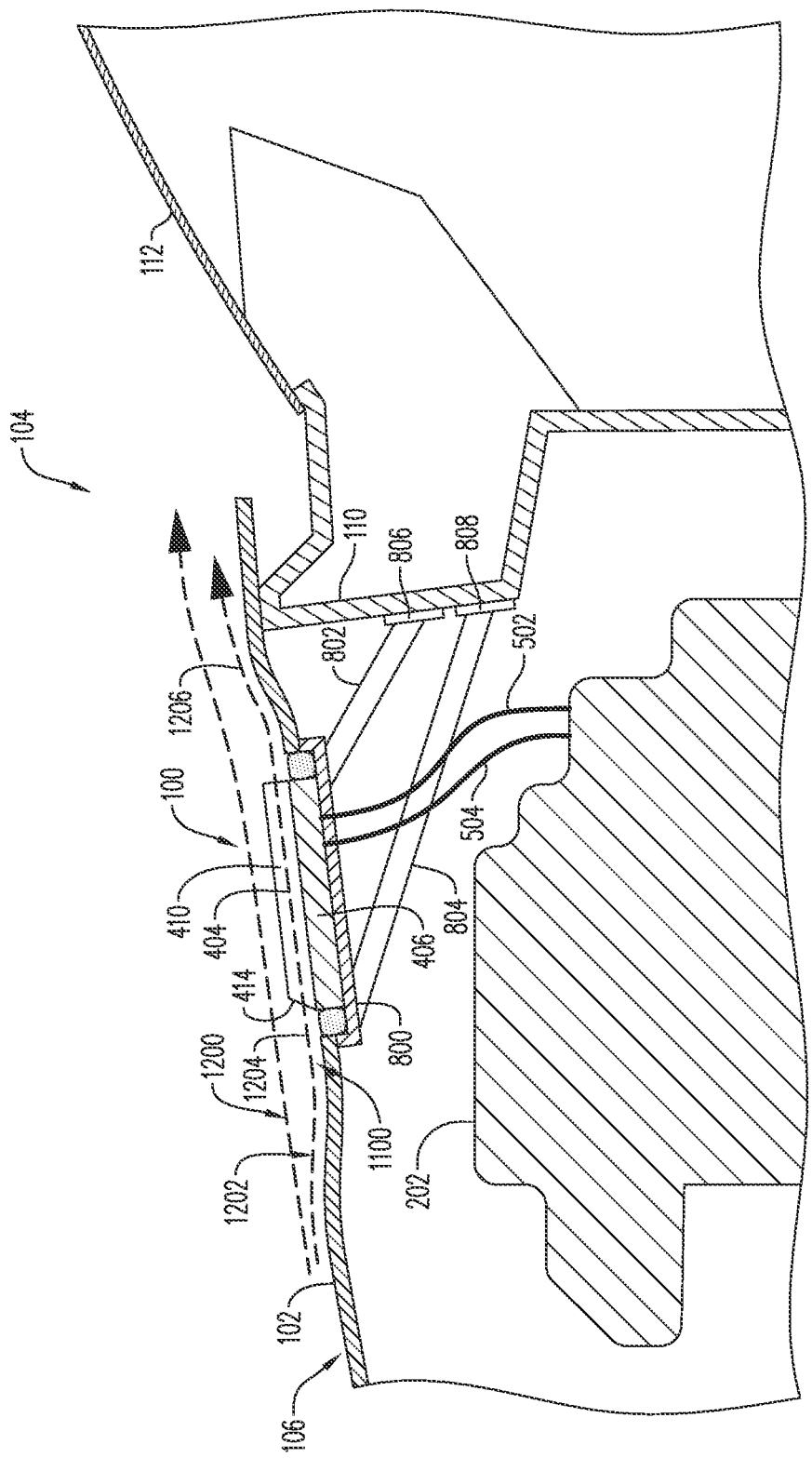
FIG. 12 is a representative side cross-section view showing airflow along the embodiment of the engine compartment-mounted heat exchanger of FIG. 11 in accordance with aspects of the present disclosure.

In some embodiments, hood 106 of vehicle 104 may be provided with a recess or depression in hood surface 102 in the area near heat exchanger 100 so as to create an area of low pressure to assist with drawing oncoming airflows towards heat exchanger 100 and increase heat transfer functions. FIGS. 11-12 illustrate another example embodiment of an engine compartment-mounted heat exchanger exposed on a hood including a recess in accordance with aspects of the present disclosure.

Referring now to FIG. 11, a side cross-section view of engine compartment-mounted heat exchanger 100 is shown located in an area of hood 106 that includes a hood recess 1100. Hood recess 1100 is an area or portion of hood 106 where hood surface 102 declines or dips to form a depression or recessed area. In this embodiment, heat exchanger 100 is located in the area corresponding to hood recess 1100.

In this embodiment, heat exchanger 100 is mounted inside the engine compartment beneath hood 106 of vehicle 104, for example, by support element 800, first support arm 802, second support arm 804, first bracket 806, and second bracket 808, as described above. With this arrangement, heat exchanger 100 may be mounted within the engine compartment of vehicle 104 in a position to extend through opening 108 in hood 106 of vehicle 104 so that outer surface 404 is exposed on hood surface 102 of vehicle 104 in the area of hood 106 corresponding to hood recess 1100.

Referring now to FIG. 12, a side cross-section view showing airflows 1200, 1202 traveling along the embodiment of the engine compartment-mounted heat exchanger of FIG. 11 in accordance with aspects of the present disclosure is illustrated. In this embodiment, one or more fins of plurality of fins 410 on outer surface 404 of heat exchanger 100 are exposed on hood surface 102 of hood 106 of vehicle 104 and are in the path of airflows 1200, 1202 as vehicle 104 is moving. In an example embodiment, heat exchanger 100 is positioned in hood recess 1100 on hood 106 with the front or leading edge 414 of each fin of plurality of fins 410 facing towards the direction of the oncoming airflows 1200, 1202 and the trailing edge of each fin of plurality of fins 410 is located on the opposite side (e.g., closer to windshield 112 of vehicle 104 than leading edge 414). In this embodiment, airflow 1200 travels over the top of heat exchanger 100 (e.g., above fins 410 on outer surface 404) following substantially above hood surface 102, while airflow 1202 travels along hood recess 1100 in hood surface 102 and passes through a portion of heat exchanger 100 (e.g., through fins 410 on outer surface 404).

With this arrangement, a first portion 1204 of airflow 1202 interacts with fins 410 of heat exchanger 100 to transfer heat from heat exchanger 100 (e.g., via heated coolant flowing through plurality of heat transfer fluid passages 416 on bottom portion 402 of heat exchanger 100) to airflow 1202. After having passed through fins 410, a second portion 1206 of airflow 1202 has absorbed a portion of the heat from heat exchanger 100 such that second portion 1206 of airflow 1202 is warmer than first portion 1204. By providing hood 106 of vehicle 104 with hood recess 1100 and positioning heat exchanger 100 in hood recess 1100, an area of low pressure is created by the recess to assist with drawing oncoming airflow 1202 towards heat exchanger 100 and thereby increase heat transfer functions. Through this mechanism, the fluid in heat exchanger 100 is cooled by action of heat transfer to airflow 1202, thereby cooling the fluid (e.g., coolant), which is returned back to the corresponding vehicle system or component (e.g., vehicle fluid coolant system 200, described above).

That is, in this embodiment, an airflow pathway of airflow 1202 is directed along the exterior surface of a first upper body component of the vehicle, for example, hood surface 102 of hood 106 of vehicle 104, to interact with heat exchanger 100 (i.e., first portion 1204 of airflow 1202) and discharge airflow (i.e., second portion 1206 of airflow 1202) is directed to flow along an exterior surface of a second upper body component of the vehicle, for example, windshield 112 of vehicle 104.

In some embodiments, mechanisms may be provided on a hood of a vehicle (e.g., on hood 106 of vehicle 104) to assist with preventing and/or reducing heat absorption by heat exchanger 100 caused by sunlight. For example, in some cases, a vehicle may be parked or stored outside and can be exposed to direct sunlight. In these cases, hood surface heat exchanger 100, including hood-mounted and engine-compartment mounted embodiments, may absorb sunlight causing heat exchanger 100 to increase its temperature, and, therefore, become less effective at transferring heat from the heated cooling fluid (e.g., coolant) during operation of the vehicle. Accordingly, as will be described in reference to FIGS. 13-18 below, in some embodiments, a cover may be provided on the hood of the vehicle that extends over the hood surface heat exchanger to reduce or minimize sunlight-based heat soaking that may occur.

Figure 13:
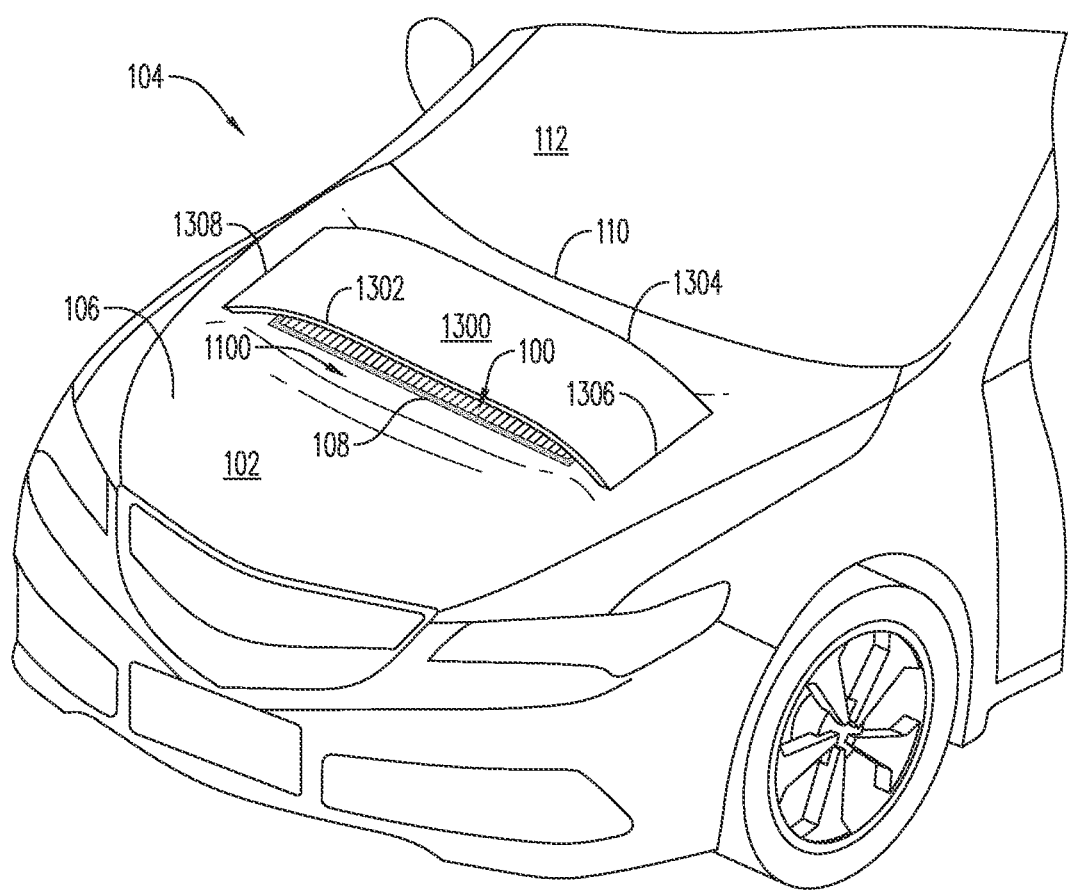
FIG. 13 is a representative view of another embodiment of a heat exchanger associated with a hood surface of a vehicle having a cover in accordance with aspects of the present disclosure.

FIG. 13 illustrates another embodiment of hood surface heat exchanger 100 associated with hood surface 102 of vehicle 104 having a cover 1300 in accordance with aspects of the present disclosure. In an example embodiment, heat exchanger 100 may extend through opening 108 in hood 106 of vehicle 104, as described above in reference to previous embodiments. For example, heat exchanger 100 may be located in an area of hood 106 that includes hood recess 1100, as described in FIGS. 11-12 above. In this embodiment, cover 1300 is positioned directly above heat exchanger 100 so as to cover heat exchanger 100 and opening 108 in hood 106 in the area of hood recess 1100.

In an example embodiment, cover 1300 includes an open front end 1302 facing towards the front of vehicle 104 and an opposite open rear end 1304 facing towards windshield 112 of vehicle 104. Front end 1302 and rear end 1304 of cover 1300 are open so that airflows may pass through cover 1300 (e.g., above and/or below) without causing significant air resistance to the airflows and affecting the aerodynamic profile of vehicle 104. In this embodiment, cover 1300 is attached or secured to hood 106 along each lateral side, including a first side 1306 corresponding to one side of vehicle 104 and an opposite second side 1308 corresponding to the other side of vehicle 104. In some cases, cover 1300 may be secured or attached to hood 106 using any type of fastening mechanism, such as, bolts, screws, rivets, and/or adhesive. In other cases, cover 1300 may manufactured or assembled as a unified part or component with hood 106 (e.g., cover 1300 is integrally formed with hood 106).

Figure 14:
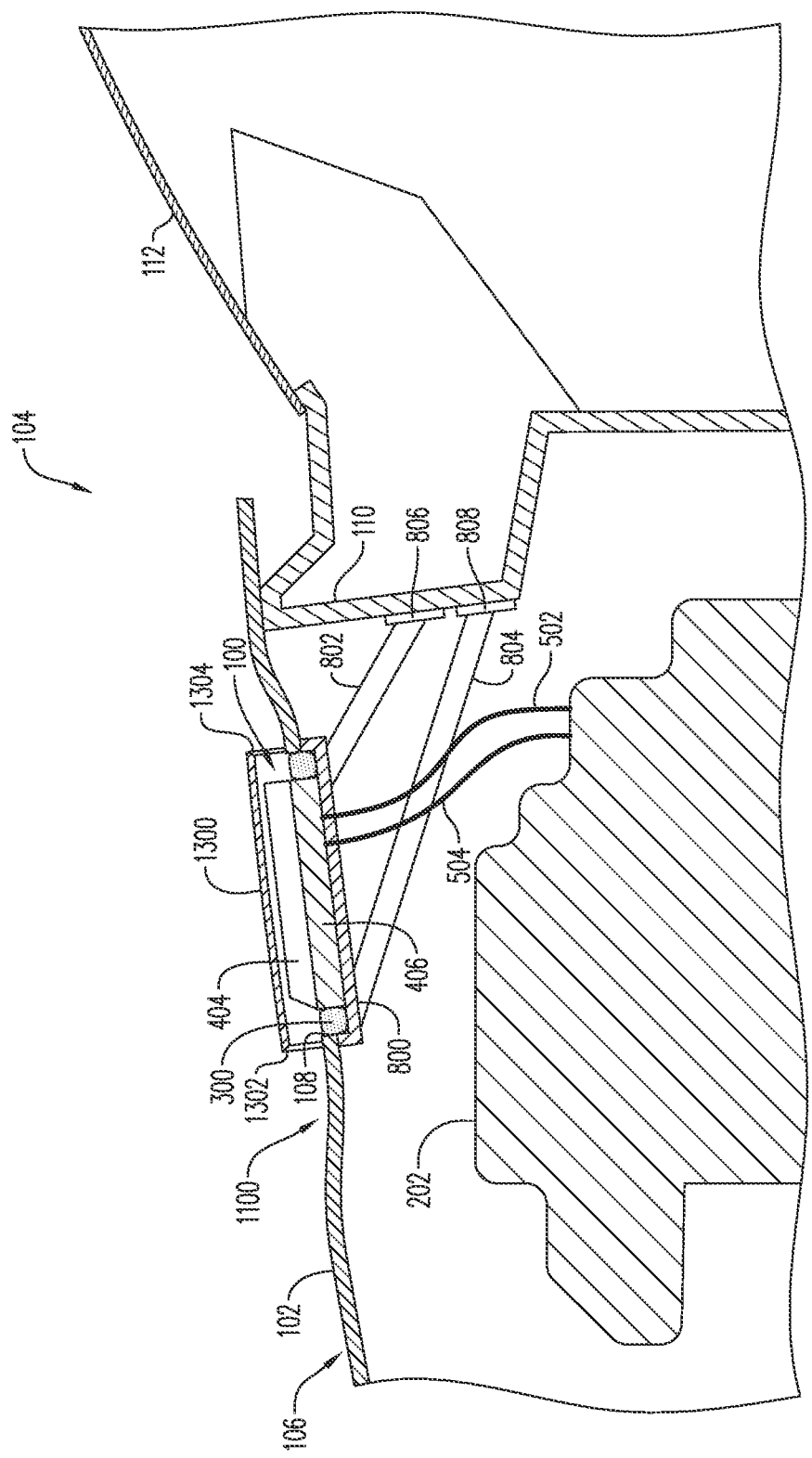
FIG. 14 is a representative side cross-section view of the embodiment of the heat exchanger of FIG. 13 in accordance with aspects of the present disclosure.

Referring now to FIG. 14, a side cross-section view of the embodiment of the heat exchanger of FIG. 13 is shown in accordance with aspects of the present disclosure. In this embodiment, heat exchanger 100 is mounted inside the engine compartment beneath hood 106 of vehicle 104, for example, by support element 800, first support arm 802, second support arm 804, first bracket 806, and second bracket 808, as described above. Additionally, in this embodiment cover 1300 extends over a portion or all of heat exchanger 100. For example, as shown in FIG. 13, front end 1302 of cover 1300 is disposed beyond opening 108 in hood 106 on one end and rear end 1304 of cover 1300 is disposed beyond opening 108 in hood 106 on the opposite end. With this arrangement, heat exchanger 100 may be mounted within the engine compartment of vehicle 104 in a position to extend through opening 108 in hood 106 of vehicle 104 so that outer surface 404 is exposed along hood surface 102 of vehicle 104 in the area of hood 106 corresponding to hood recess 1100 and is covered over its top side by cover 1300.

Figure 15:
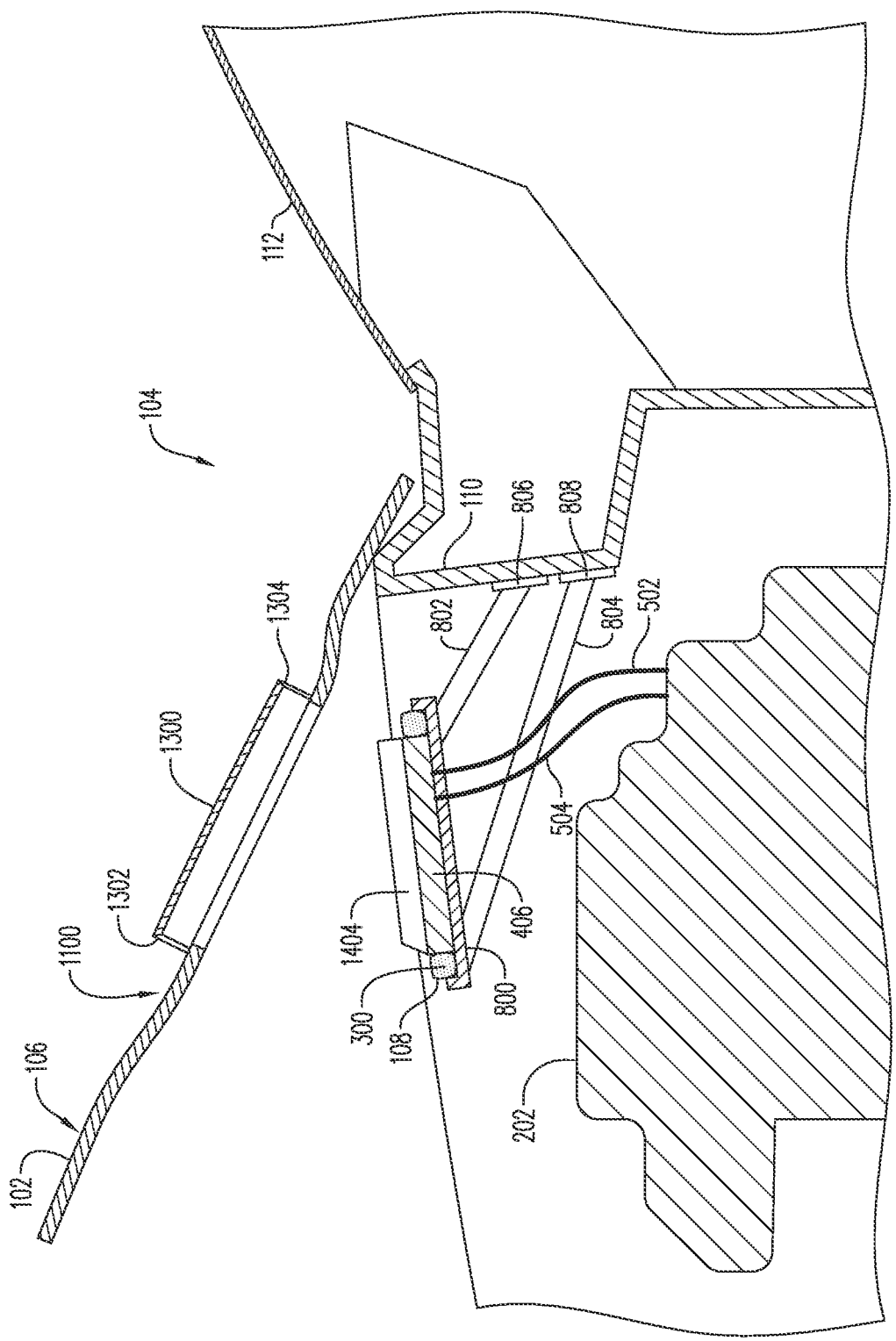
FIG. 15 is a representative side cross-section view of the example embodiment of the engine compartment-mounted heat exchanger of FIG. 13 shown with the vehicle hood in an open position in accordance with aspects of the present disclosure.

In FIG. 14, hood 106 of vehicle 104 was illustrated in a closed position. FIG. 15 is cross-section view of the example embodiment of the heat exchanger of FIG. 14 shown with the vehicle hood in an open position. As can be seen in FIG. 15, heat exchanger 100 is fixedly mounted within the engine compartment, for example, by support element 800, first support arm 802, second support arm 804, first bracket 806, and second bracket 808, which components are all disposed beneath hood 106. With this arrangement, when hood 106 is in the open position (as shown in FIG. 15), heat exchanger 100 remains in the same position as hood 106 moves upwards. That is, in contrast to FIG. 6, where heat exchanger 100 is mounted directly to hood 106 and moves along with hood 106 when in the open position. Additionally, in this embodiment, cover 1300 is attached to hood 106, therefore, cover 1300 moves with hood 106 when hood 106 is in the open position, while heat exchanger 100 remains stationary.

Figure 16:
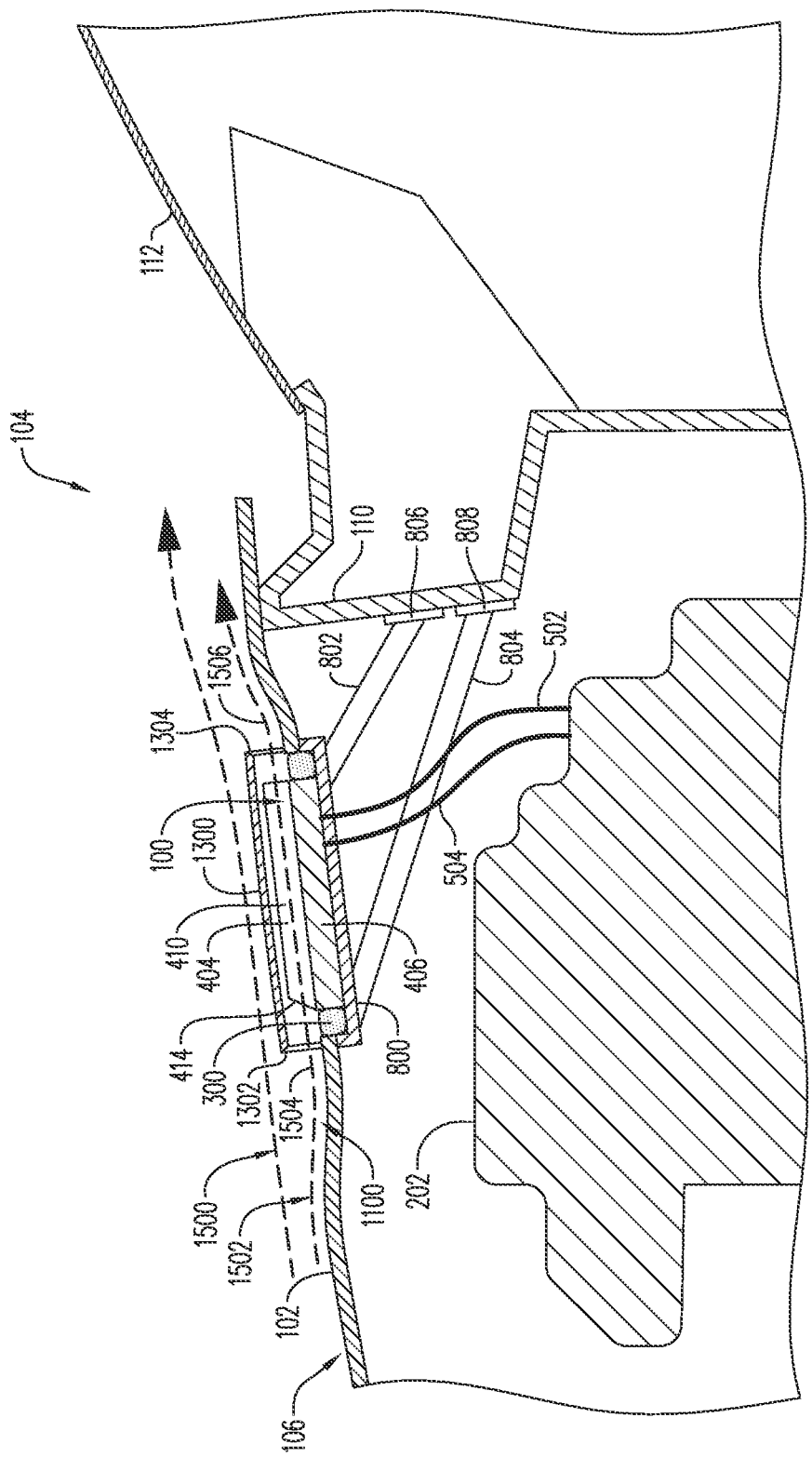
FIG. 16 is a representative side cross-section view showing airflow along the embodiment of the heat exchanger of FIG. 13 in accordance with aspects of the present disclosure.

Referring now to FIG. 16, a side cross-section view showing airflows 1500, 1502 traveling along the embodiment of the engine compartment-mounted heat exchanger of FIG. 14 in accordance with aspects of the present disclosure is illustrated. In this embodiment, one or more fins of plurality of fins 410 on outer surface 404 of heat exchanger 100 are exposed along hood surface 102 of hood 106 of vehicle 104 in the path of airflows 1500, 1502 as vehicle 104 is moving. Additionally, in this embodiment, cover 1300 extends over plurality of fins 410 on outer surface 404 of heat exchanger 100. In an example embodiment, a gap extends between a bottom of cover 1300 and outer surface 404 of heat exchanger 100 so that cover 1300 is not in direct contact with heat exchanger 100 and allows space for airflows (e.g., airflows 1500, 1502) to travel under the bottom of cover 1300 and over outer surface 404 of heat exchanger 100. For example, in one embodiment, the gap between the bottom of cover 1300 and outer surface 404 of heat exchanger 100 may be approximately 50 mm. In other embodiments, the gap between the bottom of cover 1300 and outer surface 404 of heat exchanger 100 may be larger or smaller. In some cases, the size of the gap may depend on the aerodynamic properties of hood 106 and/or vehicle 104.

In an example embodiment, heat exchanger 100 is positioned in hood recess 1100 on hood 106 with the front or leading edge 414 of each fin of plurality of fins 410 facing towards the direction of the oncoming airflows 1500, 1502 and covered by front edge 1302 of cover 1300. The trailing edge of each fin of plurality of fins 410 is located on the opposite side (e.g., closer to windshield 112 of vehicle 104 than leading edge 414) and is covered by rear edge 1304 of cover 1300. In this embodiment, airflow 1500 travels over the top of cover 1300 (e.g., above heat exchanger 100) substantially above hood surface 102, while airflow 1502 travels along hood recess 1100 in hood surface 102 and passes through a portion of heat exchanger 100 (e.g., through fins 410 on outer surface 404) underneath cover 1300.

With this arrangement, a first portion 1504 of airflow 1502 interacts with fins 410 of heat exchanger 100 to transfer heat from heat exchanger 100 (e.g., via heated coolant flowing through plurality of heat transfer fluid passages 416 on bottom portion 402 of heat exchanger 100) to airflow 1502. After having passed through fins 410, a second portion 1506 of airflow 1502 has absorbed a portion of the heat from heat exchanger 100 such that second portion 1506 of airflow 1502 is warmer than first portion 1504. By providing hood 106 of vehicle 104 with hood recess 1100 and positioning heat exchanger 100 in hood recess 1100 and beneath cover 1300, an area of low pressure is created by the recess to assist with drawing oncoming airflow 1502 towards heat exchanger 100 and thereby increase heat transfer functions. Through this mechanism, the fluid in heat exchanger 100 is cooled by action of heat transfer to airflow 1502, thereby cooling the fluid (e.g., coolant), which is returned back to the corresponding vehicle system or component (e.g., vehicle fluid coolant system 200, described above).

That is, in this embodiment, an airflow pathway of airflow 1502 is directed along the exterior surface of a first upper body component of the vehicle, for example, hood surface 102 of hood 106 of vehicle 104, to interact with heat exchanger 100 (i.e., first portion 1504 of airflow 1502) and discharge airflow (i.e., second portion 1506 of airflow 1502) is directed to flow along an exterior surface of a second upper body component of the vehicle, for example, windshield 112 of vehicle 104.

In some embodiments, an alternate embodiment of a heat exchanger having a plurality of fins on both the top and bottom sides (e.g. a dual-sided heat exchanger) may be used in connection with any of the example embodiments described herein. For example, a dual-sided heat exchanger may be hood mounted, for example, as described in connection with the embodiments shown in FIGS. 5-7, or may be engine-compartment mounted, for example, as described in connection with the embodiments shown in FIGS. 8-16. Additionally, a dual-sided heat exchanger may be used in connection with hood 106 with or without hood recess 1100 and/or with or without cover 1300.

Figure 17:
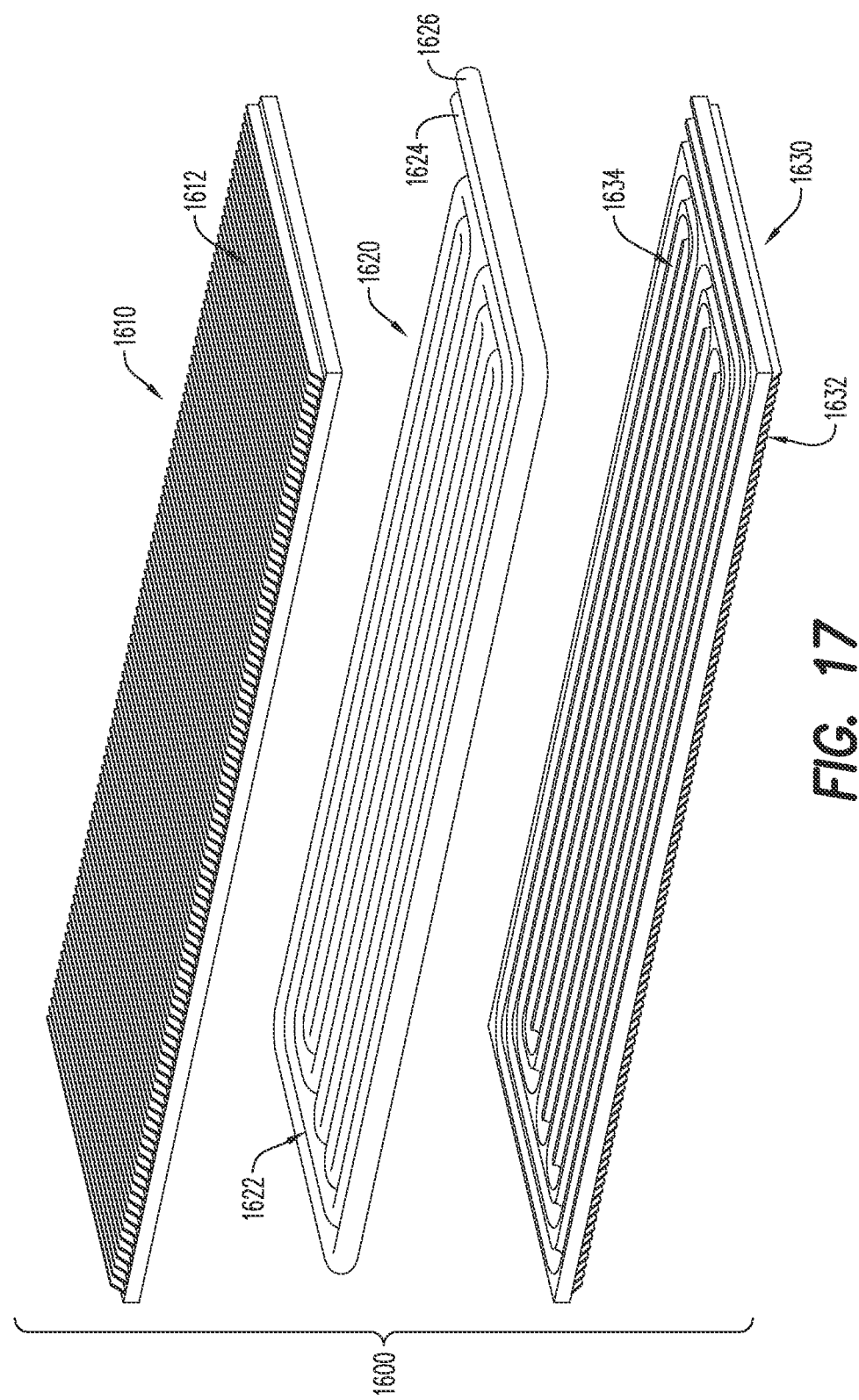
FIG. 17 is an exploded isometric view of another embodiment of a heat exchanger having top and bottom fin surfaces in accordance with aspects of the present disclosure.

FIG. 17 is an exploded isometric view of another embodiment of a heat exchanger having top and bottom fin surfaces in accordance with aspects of the present disclosure. In this embodiment, a dual-sided heat exchanger 1600 includes an upper portion 1610 having a plurality of fins 1612. Plurality of fins 1612 may have a substantially similar configuration, shape, and/or arrangement as plurality of fins 410, described above in reference to FIGS. 4A-4B.

In this embodiment, dual-sided heat exchanger 1600 further includes a middle portion 1620. Middle portion 1620 includes a plurality of heat transfer fluid passages 1622. Plurality of fluid passages 1622 may comprise one or more tubes or other conduits that are arranged along middle portion 1620 of dual-sided heat exchanger 1600. Plurality of heat transfer fluid passages 1622 may have a substantially similar configuration, shape, and/or arrangement as plurality of fluid passages 416, described above in reference to FIG. 4C, and are configured for the heat transfer fluid or cooling fluid (e.g., coolant) to flow through as air passes over upper and lower portions of dual-sided heat exchanger 1600.

In this embodiment, dual-sided heat exchanger 1600 further includes a lower portion 1630. Lower portion 1630 is substantially similar to upper portion 1610 located on the opposite side of dual-sided heat exchanger 1600. Lower portion 1630 includes a plurality of fins 1632 that have a substantially similar configuration, shape, and/or arrangement as plurality of fins 1612, 410, described above and in reference to FIGS. 4A-4B. As can be seen in FIG. 17, a top side of lower portion 1630 of dual-sided heat exchanger 1600 includes a plurality of channels 1634 that are configured to receive and correspond with the serpentine shape of plurality of heat transfer fluid passages 1622 of middle portion 1620. With this arrangement, plurality of heat transfer fluid passages 1622 may fit into and be in contact with plurality of channels 1634 to assist with heat transfer from the heated fluid flowing through heat transfer fluid passages 1622 to plurality of fins 1632.

As shown in the embodiment of FIG. 17, fluid passages 1622 are arranged in an approximately serpentine pattern on middle portion 1620 of dual-sided heat exchanger 1600 and guide the cooling fluid via an inlet 1624 to an outlet 1626 forming a cooling fluid flow circuit configured to transfer heat from the cooling fluid while the vehicle (e.g., vehicle 104) is in motion to oncoming air passing over plurality of fins 1612 located above fluid passages 1622 on upper portion 1610 of dual-sided heat exchanger 1600, as well as over plurality of fins 1632 located below fluid passages 1622 on lower portion 1630 of dual-sided heat exchanger 1600.

Additionally, in some embodiments, a bottom side of upper portion 1610 may have a substantially similar plurality of channels as channels 1634 that are also configured to receive and correspond with the serpentine shape of plurality of heat transfer fluid passages 1622 of middle portion 1620. With this arrangement, plurality of heat transfer fluid passages 1622 may fit into and be in contact with plurality of channels on both upper portion 1610 and lower portion 1630 of dual-sided heat exchanger 1600 to further assist with heat transfer from the heated fluid flowing through heat transfer fluid passages 1622 to plurality of fins on the top and bottom sides of dual-sided heat exchanger 1600.

Thus, in some embodiments, dual-sided heat exchanger 1600 may be more efficient at heat transfer than a heat exchanger having fins only on one side. This feature of dual-sided heat exchanger 1600 may allow it to provide a greater heat transfer or cooling capacity than a similarly sized single-sided heat exchanger or may allow it to provide a substantially similar heat transfer or cooling capacity using an overall smaller size and/or surface area, which may allow dual-sided heat exchanger 1600 to be located on areas of a hood of a vehicle where there may not otherwise be sufficient space for a larger heat exchanger.

Figure 18:
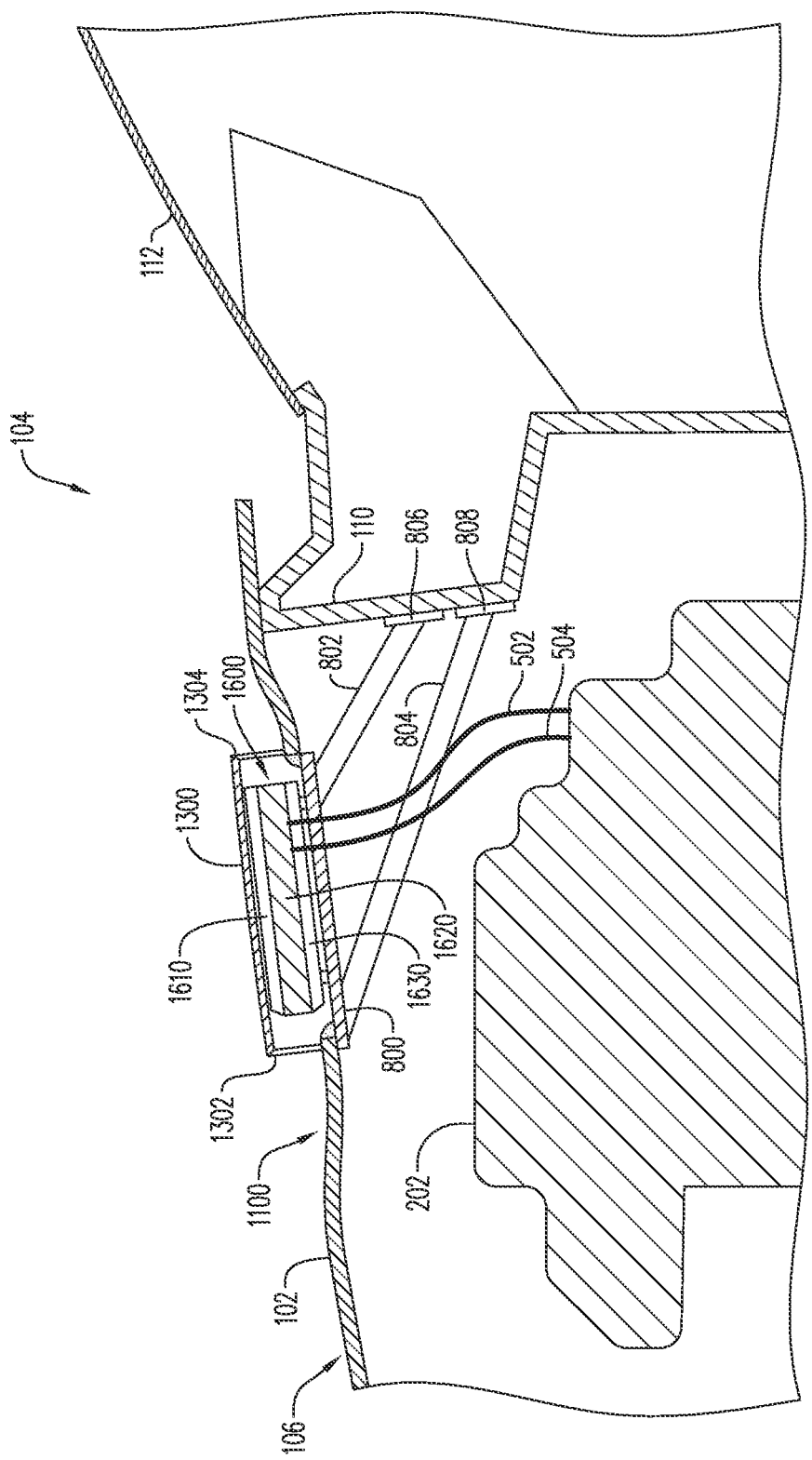
FIG. 18 is a representative side cross-section view of the embodiment of the heat exchanger of FIG. 17 shown disposed within a recess in the vehicle hood in accordance with aspects of the present disclosure.

Referring now to FIG. 18, a side cross-section view of the embodiment of dual-side heat exchanger 1600 of FIG. 17 is shown disposed within hood recess 1100 in hood 106 of vehicle 104 in accordance with aspects of the present disclosure. In this embodiment, dual-side heat exchanger 1600 is also covered by cover 1300, as described above in reference to FIGS. 13-16.

In this embodiment, dual-sided heat exchanger 1600 is mounted inside the engine compartment beneath hood 106 of vehicle 104, for example, by support element 800, first support arm 802, second support arm 804, first bracket 806, and second bracket 808, as described above. Additionally, in this embodiment cover 1300 extends over a portion or all of heat exchanger dual-sided heat exchanger 1600. For example, as shown in FIG. 18, front end 1302 of cover 1300 is disposed beyond opening 108 in hood 106 on one end and rear end 1304 of cover 1300 is disposed beyond opening 108 in hood 106 on the opposite end. With this arrangement, dual-sided heat exchanger 1600 may be mounted within the engine compartment of vehicle 104 in a position to extend through opening 108 in hood 106 of vehicle 104 so that both upper portion 1610 and lower portion 1630 are exposed along hood surface 102 of vehicle 104 in the area of hood 106 corresponding to hood recess 1100. Additionally, in this embodiment, upper portion 1610 of dual-sided heat exchanger 1600 is covered over by cover 1300.

Figure 19:
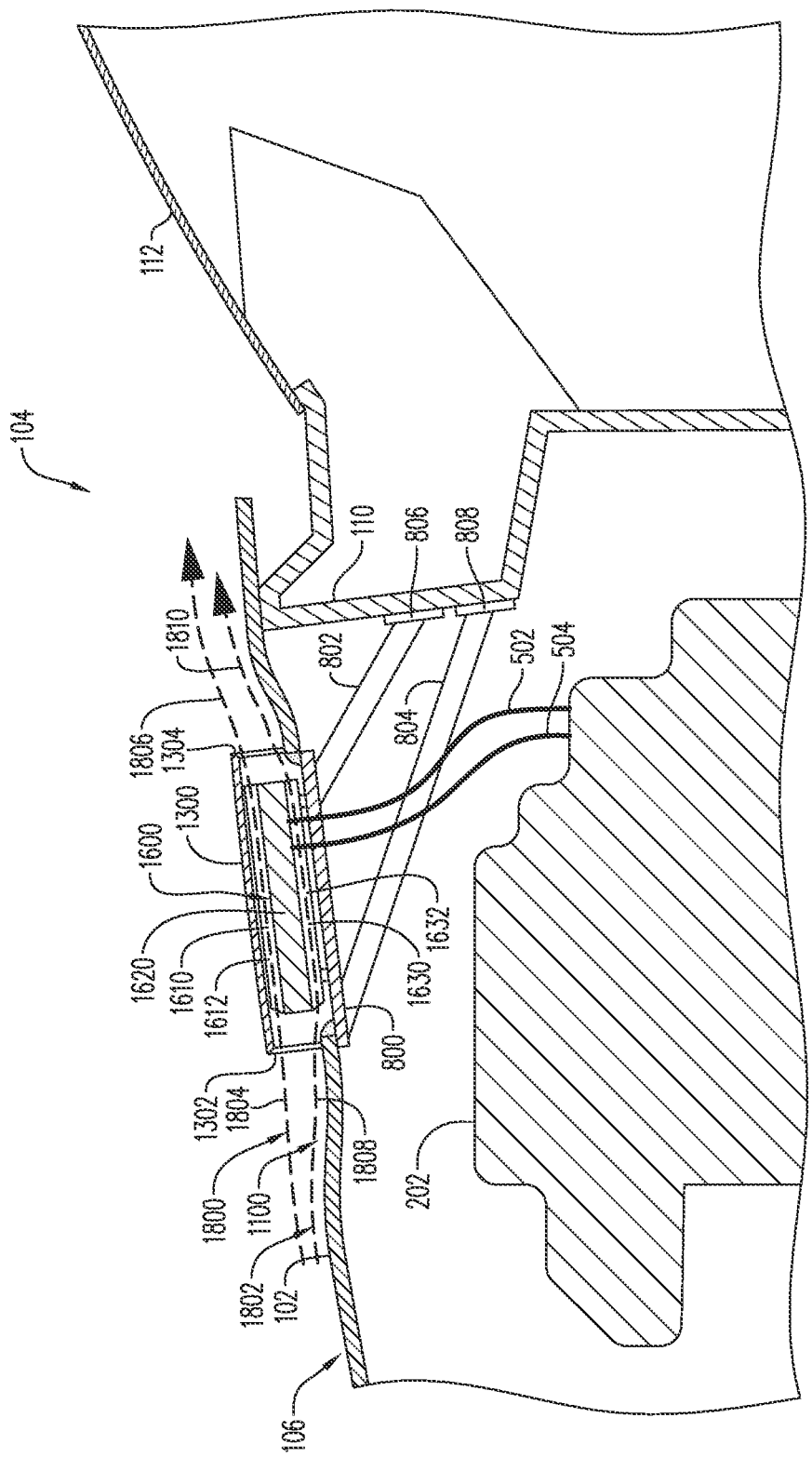
FIG. 19 is a representative side cross-section view showing airflow along the embodiment of the heat exchanger of FIG. 17 in accordance with aspects of the present disclosure.

Referring now to FIG. 19, a side cross-section view showing airflows 1800, 1802 traveling along the embodiment of dual-sided heat exchanger 1600 of FIG. 18 in accordance with aspects of the present disclosure is illustrated. In this embodiment, one or more fins of plurality of fins 1612 on upper portion 1610 of dual-sided heat exchanger 1600 and one or more fins of plurality of fins 1632 on lower portion 1630 of dual-sided heat exchanger 1600 are exposed along hood surface 102 of hood 106 of vehicle 104 in the path of airflows 1800, 1802 as vehicle 104 is moving. Additionally, in this embodiment, cover 1300 extends over dual-sided heat exchanger 1600.

In an example embodiment, a gap extends between a bottom of cover 1300 and upper portion 1610 of dual-sided heat exchanger 1600 so that cover 1300 is not in direct contact with dual-sided heat exchanger 1600 and allows space for airflows (e.g., airflows 1800, 1802) to travel under the bottom of cover 1300 and over dual-sided heat exchanger 1600. For example, in one embodiment, the gap between the bottom of cover 1300 and dual-sided heat exchanger 1600 may be approximately 50 mm. In other embodiments, the gap may be larger or smaller, as described above.

In an example embodiment, dual-sided heat exchanger 1600 is positioned in hood recess 1100 on hood 106 with the front or leading edge of each fin of plurality of fins 1612, 1632 facing towards the direction of the oncoming airflows 1800, 1802 and covered by front edge 1302 of cover 1300. The trailing edge of each fin of plurality of fins 1612, 1632 is located on the opposite side (e.g., closer to windshield 112 of vehicle 104 than the leading edge) and is covered by rear edge 1304 of cover 1300. In this embodiment, airflow 1800 travels under cover 1300 and through fins 1612 of upper portion 1610 of dual-sided heat exchanger 1600, while airflow 1802 travels along hood recess 1100 in hood surface 102 and passes through fins 1632 of lower portion 1630 of dual-sided heat exchanger 1600.

With this arrangement, a first portion 1804 of airflow 1800 interacts with fins 1612 of upper portion 1610 of dual-sided heat exchanger 1600 to transfer heat from heated coolant flowing through plurality of heat transfer fluid passages 1622 on middle portion 1620 of dual-sided heat exchanger 1600 to airflow 1800. After having passed through fins 1612, a second portion 1806 of airflow 1800 has absorbed a portion of the heat from dual-sided heat exchanger 1600 such that second portion 1806 of airflow 1800 is warmer than first portion 1804. Similarly, a first portion 1808 of airflow 1802 interacts with fins 1632 of lower portion 1630 of dual-sided heat exchanger 1600 to transfer heat from heated coolant flowing through plurality of heat transfer fluid passages 1622 on middle portion 1620 of dual-sided heat exchanger 1600 to airflow 1802. After having passed through fins 1632, a second portion 1810 of airflow 1802 has also absorbed a portion of the heat from dual-sided heat exchanger 1600 such that second portion 1810 of airflow 1802 is warmer than first portion 1808.

That is, in this embodiment, an airflow pathway of airflow 1800 and/or airflow 1802 is directed along the exterior surface of a first upper body component of the vehicle, for example, hood surface 102 of hood 106 of vehicle 104, to interact with heat exchanger 100 (i.e., first portion 1804 of airflow 1800 and/or first portion 1808 of airflow 1802) and discharge airflow (i.e., second portion 1806 of airflow 1800 and/or second portion 1810 of airflow 1802) is directed to flow along an exterior surface of a second upper body component of the vehicle, for example, windshield 112 of vehicle 104.

By providing dual-sided heat exchanger 1600 on hood 106 of vehicle 104, airflows may pass through fins both above and below dual-sided heat exchanger 1600 to thereby increase heat transfer functions. Through this mechanism, the fluid in dual-sided heat exchanger 1600 is cooled by action of heat transfer to airflow 1800, 1802, thereby cooling the fluid (e.g., coolant), which is returned back to the corresponding vehicle system or component (e.g., vehicle fluid coolant system 200, described above).

Figure 20:
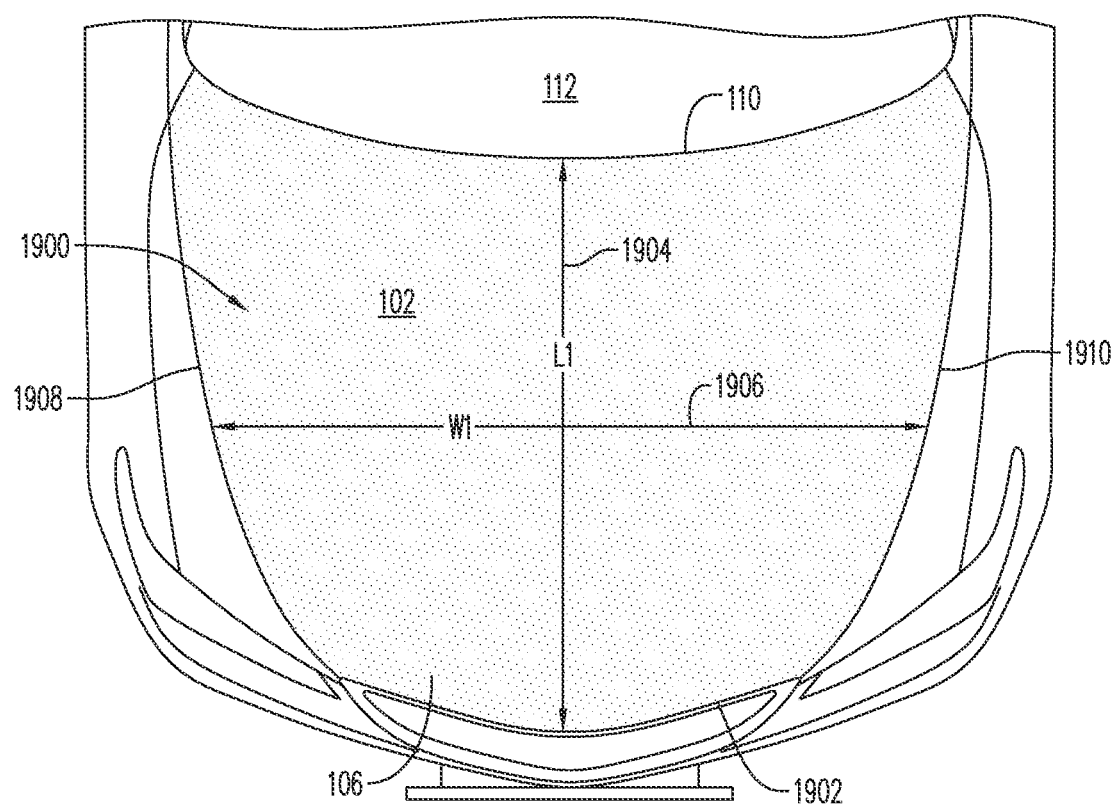
FIG. 20 is a top view of an example embodiment of a placement area associated with a hood surface of a vehicle for a heat exchanger in accordance with aspects of the present disclosure.

In some embodiments, a hood surface heat exchanger in accordance with the techniques described herein (e.g., heat exchanger 100 and/or dual-sided heat exchanger 1600) may be located at any suitable location on a hood of a vehicle. Referring now to FIG. 20, a top view of an example embodiment of a placement area 1900 associated with hood surface 102 of hood 106 of vehicle 104 for locating a heat exchanger in accordance with aspects of the present disclosure is shown. Placement area 1900 may be associated with a length (L1) 1904 extending from a front end 1902 of hood 106 to bulkhead 110 near windshield. Placement area 1900 may also be associated with a width (W1) 1906 extending between a first edge 1908 of hood 106 on one side of vehicle 104 to a second edge 1910 of hood 106 on the opposite side of vehicle 104.

Figure 21:
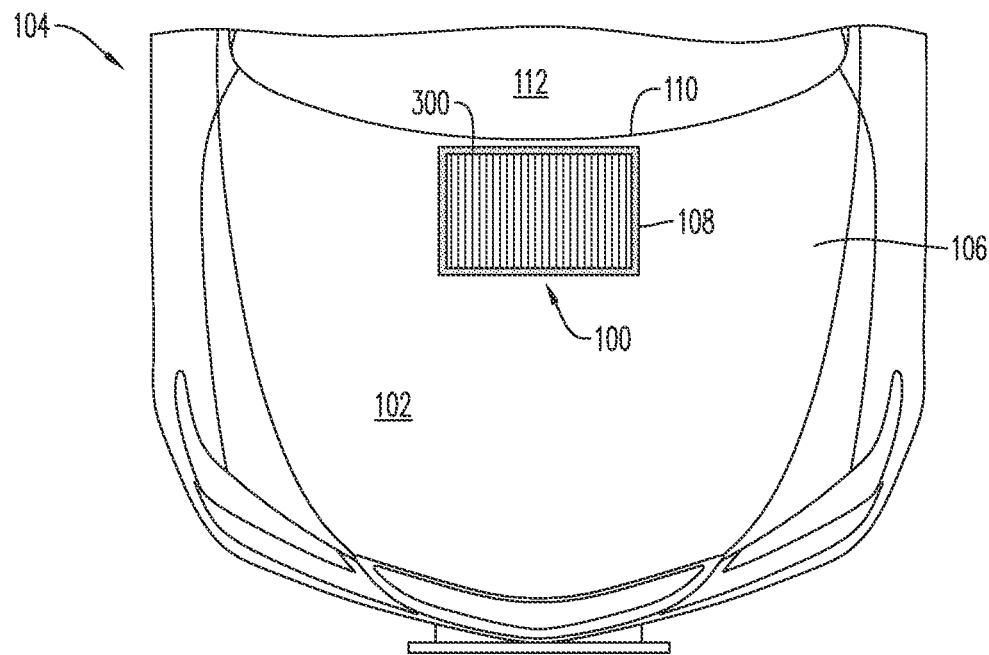
FIG. 21 is a top view of an example embodiment of a heat exchanger located near a rear portion of a vehicle upper body component.

As described above, in various embodiments, a heat exchanger according to the techniques described herein may be located at different locations relative to an upper body or upper body component of a vehicle. For example, FIG. 21 illustrates a top view of an example embodiment of heat exchanger 100 that is located at a rear portion of vehicle hood 106 near bulkhead 110 (or firewall) of vehicle 104 that separates hood 106 from windshield 112 of vehicle 104. As shown in this embodiment, vehicle 104 includes a first upper body component, for example, in the form of hood 106, that is positioned on a forward half of vehicle 104. Hood 106 includes an exterior surface, for example, hood surface 102, that is opposite an interior surface facing towards an interior compartment of vehicle 104 (e.g., the engine compartment beneath hood 106). As described above, the first upper body component (e.g., hood 106) includes opening 108 to the internal compartment of vehicle 104.

In this embodiment, vehicle 104 also includes a second upper body component, for example, in the form of windshield 112. Windshield 112 is positioned rearward of the first upper body component (e.g., hood 106) and includes an exterior surface on the exterior of vehicle 104. As shown in FIG. 21, heat exchanger 100 is a surface heat exchanger (i.e., in contrast to a flow-through heat exchanger, such as main radiator 204, described above) that is aligned with opening 108 along the length of vehicle 104 near bulkhead 110 (or firewall) of vehicle 104 that separates hood 106 from windshield 112. With this arrangement, an airflow pathway is formed such that air flows along the exterior surface of the first upper body component (e.g., hood surface 102 of hood 106) and heat exchanger 100 and discharge air (e.g., the cooled air after interacting with heat exchanger 100, as described above) is directed to flow along the exterior surface of the second upper body component (e.g., the exterior surface of windshield 112).

Figure 22:
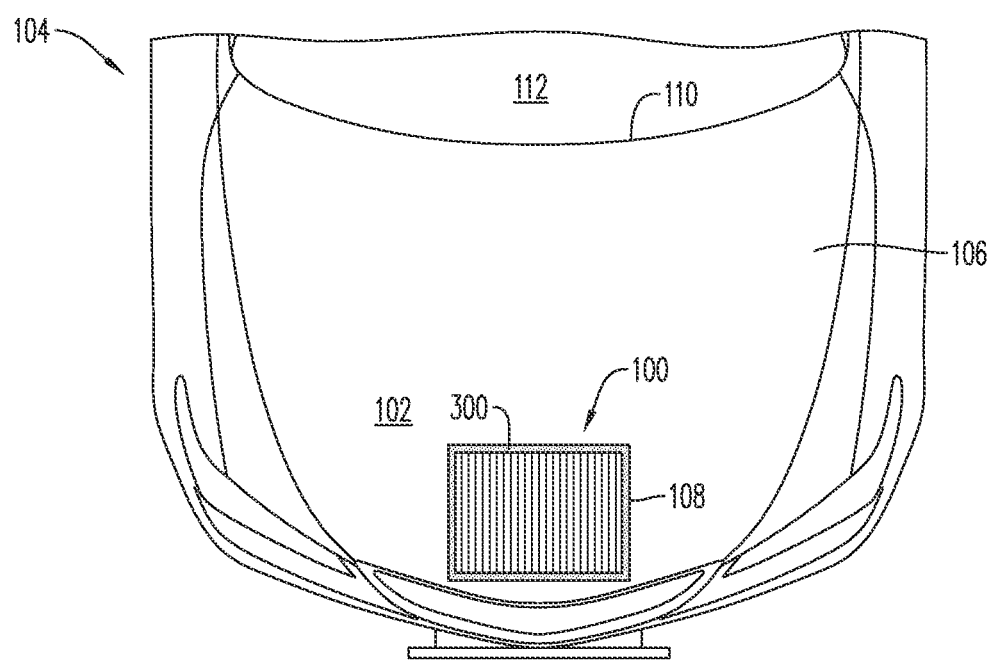
FIG. 22 is a top view of an example embodiment of a heat exchanger located near a front portion of a vehicle upper body component.

In another example, FIG. 22 illustrates a top view of an example embodiment of heat exchanger 100 that is located near a front portion of vehicle hood 106 near a front bumper of vehicle 104. As shown in this embodiment, vehicle 104 includes a first upper body component, for example, in the form of hood 106, that is positioned on a forward half of vehicle 104. Hood 106 includes an exterior surface, for example, hood surface 102, that is opposite an interior surface facing towards an interior compartment of vehicle 104 (e.g., the engine compartment beneath hood 106). As described above, the first upper body component (e.g., hood 106) includes opening 108 to the internal compartment of vehicle 104.

In this embodiment, vehicle 104 also includes a second upper body component, for example, in the form of windshield 112. Windshield 112 is positioned rearward of the first upper body component (e.g., hood 106) and includes an exterior surface on the exterior of vehicle 104. As shown in FIG. 22, heat exchanger 100 is aligned with opening 108 along the length of vehicle 104 near the front bumper of vehicle 104. With this arrangement, an airflow pathway is formed such that air flows along heat exchanger 100 and discharge air (e.g., the cooled air after interacting with heat exchanger 100, as described above) is directed to flow along the exterior surface of the first upper body component (e.g., hood surface 102 of hood 106) located rearward of heat exchanger 100. Additionally, in some embodiments, the discharge air may further flow along the exterior surface of the second upper body component (e.g., the exterior surface of windshield 112).

In various embodiments, one or more hood surface heat exchangers (e.g., heat exchanger 100 and/or dual-sided heat exchanger 1600) may located anywhere on hood surface 102 of hood 106 within placement area 1900. For example, in some cases, depending on the configuration and arrangement of vehicle 104, including arrangement of engine/motor 202 and/or vehicle fluid coolant system 200, different locations for a hood surface heat exchanger within placement area 1900 may be desired. With this arrangement, a hood surface heat exchanger according to the techniques described herein may be used to provide additional or supplemental heat transfer capabilities to a main or primary radiator (e.g., main radiator 204, described above) that is conventionally mounted or located at the front of the vehicle 104 and arranged such that air passes through front grille openings at the front of the vehicle to flow through the main radiator in a crossflow or substantially perpendicular manner.

Figure 23:
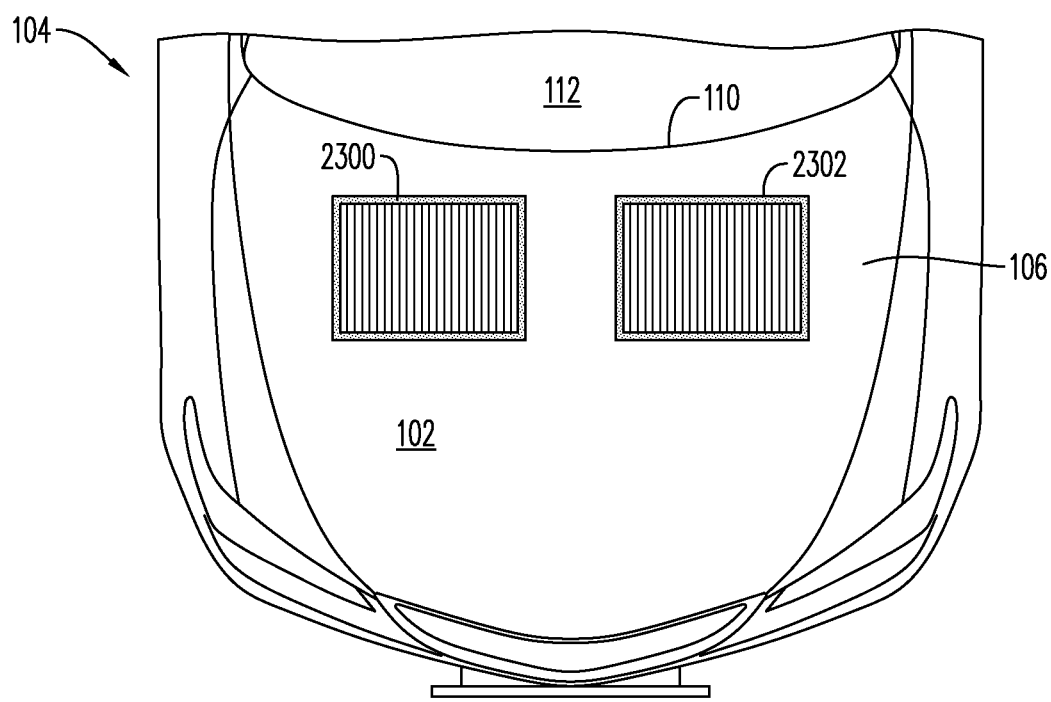
FIG. 23 is a top view of an example embodiment of a vehicle upper body component including two heat exchangers.

In some embodiments, a vehicle upper body and/or vehicle upper body component may include more than one surface heat exchanger, including any two or more heat exchangers described above in reference to the example embodiments, including combinations of different types or configurations of heat exchangers. For example, as shown in FIG. 23, vehicle 104 may include two heat exchangers arranged on the vehicle upper body and/or vehicle upper body component (e.g., hood surface 102 of hood 106). In this embodiment, vehicle 104 includes a first heat exchanger 2300 and a second heat exchanger 2302. First heat exchanger 2300 and second heat exchanger 2302 may be substantially similar to any of the previous embodiments of heat exchangers described herein. With this arrangement, two or more surface heat exchangers may be arranged on a vehicle upper body and/or vehicle upper body component to provide additional supplemental heat transfer capabilities.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. An upper body heat exchanger for a vehicle, comprising:
   a first portion comprising a plurality of fins disposed on a first surface of the upper body heat exchanger;
   a second portion comprising a plurality of heat transfer fluid passages disposed on a second surface of the upper body heat exchanger, the second portion being disposed beneath the first portion;
   the upper body heat exchanger being mounted on the vehicle such that the first surface of the first portion of the upper body heat exchanger is exposed to an exterior of the vehicle;
   wherein the plurality of heat transfer fluid passages are configured to transfer heat from heated fluid flowing through the plurality of heat transfer fluid passages to airflows interacting with the plurality of fins as the vehicle is moving;
   wherein a portion of the upper body heat exchanger is exposed at a hood surface on top of a hood of the vehicle and extends through an opening in the top of the hood; and
   wherein the portion of the upper body heat exchanger that extends through the opening is co-planar with an outermost hood surface of the hood.

2. The upper body heat exchanger according to claim 1, wherein the plurality of fins on the first surface of the first portion of the upper body heat exchanger extend through the opening in the hood surface of the hood of the vehicle so as to be located above the opening.

3. The upper body heat exchanger according to claim 2, wherein the upper body heat exchanger is mounted to the hood of the vehicle such that the upper body heat exchanger is configured to move with the hood when the hood is transitioned from a closed position to an open position.

4. The upper body heat exchanger according to claim 2, wherein the upper body heat exchanger is mounted within an engine compartment of the vehicle such that the upper body heat exchanger is configured to remain in place when the hood is transitioned from a closed position to an open position.

5. The upper body heat exchanger according to claim 2, wherein the hood surface of the hood of the vehicle further includes a hood recess; and
   wherein the upper body heat exchanger is positioned in the hood recess such that the first surface of the first portion of the upper body heat exchanger is exposed.

6. The upper body heat exchanger according to claim 2, further comprising a cover extending over the first surface of the first portion of the upper body heat exchanger; and
   wherein the cover is attached to the hood of the vehicle along a first side corresponding to a first lateral side of the vehicle and a second side corresponding to a second lateral side of the vehicle.

7. The upper body heat exchanger according to claim 2, wherein the plurality of fins are substantially aligned along a direction corresponding to an airflow direction of air moving along the outermost hood surface of the vehicle when the vehicle is moving.

8. The upper body heat exchanger according to claim 1, wherein the upper body heat exchanger is in fluid communication with a vehicle fluid coolant system.

9. The upper body heat exchanger according to claim 1, further comprising a third portion comprising a plurality of channels on one side that are configured to receive and correspond with the plurality of heat transfer fluid passages of the second portion and a plurality of fins disposed on an opposite side.

10. The upper body heat exchanger according to claim 9, wherein the plurality of fins on the third portion face towards an internal compartment of the vehicle.

11. The upper body heat exchanger according to claim 1, wherein a gasket extends around a perimeter of the opening in the hood to form a seal between the upper body heat exchanger and the hood at the hood surface.

12. A vehicle heat transfer system, comprising:
    a first upper body component positioned on a forward half of a vehicle and including a hood of the vehicle, the first upper body component comprising an exterior surface and an opposite interior surface, wherein the interior surface defines at least a portion of an internal compartment of the vehicle, and wherein the first upper body component includes an opening to the internal compartment disposed on a top of the first upper body component;
    a second upper body component positioned rearward of the first upper body component on the vehicle, the second upper body component comprising an exterior surface;
    a heat exchanger aligned with the opening in the first upper body component along the length of the vehicle to form an airflow pathway with the exterior surface of the first upper body component, wherein discharge air from the heat exchanger is directed to flow along the exterior surface of the second upper body component;
    wherein a portion of the heat exchanger is exposed at a hood surface on the top of the hood and extends through the opening in the top of the hood; and
    wherein the portion of the heat exchanger that extends through the opening is co-planar with an outermost hood surface of the hood.

13. The heat transfer system according to claim 12, wherein the opening is positioned at a rearward end of the hood adjacent to the second upper body component.

14. The heat transfer system according to claim 12, wherein the second upper body component is a windshield of the vehicle.

15. The heat transfer system according to claim 12, wherein the heat exchanger extends through the opening in the hood from within the internal compartment to a position located above the exterior surface.

16. The heat transfer system according to claim 12, wherein the portion of the heat exchanger that extends through the opening includes a plurality of fins that extend above the opening.

17. The heat transfer system according to claim 16, wherein the plurality of fins are substantially aligned along a direction corresponding to an airflow direction of air moving along the outermost hood surface of the vehicle when the vehicle is moving.

18. The heat transfer system according to claim 12, wherein a gasket extends around a perimeter of the opening in the hood to form a seal between the heat exchanger and the hood at the hood surface.

* * * * *